US010921798B2

(12) United States Patent
Shahroudi

(10) Patent No.: US 10,921,798 B2
(45) Date of Patent: *Feb. 16, 2021

(54) ANOMALY DETECTION AND ANOMALY-BASED CONTROL

(71) Applicant: Woodward, Inc., Fort Collins, CO (US)

(72) Inventor: Kamran Eftekhari Shahroudi, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/664,289

(22) Filed: Oct. 25, 2019

(65) Prior Publication Data

US 2020/0057433 A1 Feb. 20, 2020

Related U.S. Application Data

(63) Continuation of application No. 15/906,924, filed on Feb. 27, 2018, now Pat. No. 10,642,262.

(51) Int. Cl.
*G05B 19/418* (2006.01)
*G05B 23/02* (2006.01)

(52) U.S. Cl.
CPC ... *G05B 23/0275* (2013.01); *G05B 19/41875* (2013.01); *G05B 23/024* (2013.01);
(Continued)

(58) Field of Classification Search
CPC .......... G05B 23/0275; G05B 19/41875; G05B 2219/32222; G05B 23/024;
(Continued)

(56) References Cited

U.S. PATENT DOCUMENTS 3,958,109 A 5/1976 Doherty et al.
5,043,863 A 8/1991 Bristol et al.
(Continued)

FOREIGN PATENT DOCUMENTS

EP 1603064 A1 12/2005

OTHER PUBLICATIONS

Cardenas et al., "Attacks Against Process Control Systems: Risk Assessment, Detection, and Response," Proceedings of the 6th ACM symposium on information, computer and communications security, Mar. 22-24, 2011, 355-366 page.
(Continued)

*Primary Examiner* — Rocio Del Mar Perez-Velez
*Assistant Examiner* — Alicia M. Choi
(74) *Attorney, Agent, or Firm* — Fish & Richardson P.C.

(57) ABSTRACT

A plant control system includes a plant system and a control system controlling the plant system. Runtime conditions of an operating point of the plant control system are received. The runtime conditions include a runtime state of the plant system, a runtime output of the plant system, and a runtime control action applied to the plant system. Reference conditions of a reference point corresponding to the operating point are determined. Stability radius measures of a state difference, an output difference, and a control action difference are computed. One or more of an observability anomaly indicator, health observability indicator, tracking performance anomaly indicator, tracking performance health indicator, controllability anomaly indicator, and controllability health indicator are determined based on respective spectral correlations between two of the stability radius measure of the output difference, the stability radius measure of the state difference, and the stability radius measure of the control action difference.

18 Claims, 24 Drawing Sheets

(52) U.S. Cl.
CPC ..... *G05B 23/0254* (2013.01); *G05B 23/0286* (2013.01); *G05B 2219/32191* (2013.01); *G05B 2219/32222* (2013.01)

(58) Field of Classification Search
CPC ............ G05B 23/0254; G05B 23/0286; G05B 2219/32191; G10L 21/0388; G01J 3/45
USPC ......................................................... 700/108
See application file for complete search history.

(56) References Cited

U.S. PATENT DOCUMENTS

| | | | |
|---|---|---|---|
| 5,394,322 | A | 2/1995 | Hansen |
| 5,869,945 | A | 2/1999 | Ha et al. |
| 6,195,596 | B1 | 2/2001 | Kim |
| 7,222,047 | B2 | 5/2007 | McMillan et al. |
| 7,502,715 | B1 | 3/2009 | Middlebrooks |
| 7,756,593 | B2 | 7/2010 | Miller |
| 7,818,276 | B2 | 10/2010 | Veillette et al. |
| 7,966,104 | B2 | 6/2011 | Srivastava et al. |
| 8,139,286 | B2 | 3/2012 | Huang et al. |
| 8,200,347 | B2 | 6/2012 | El-Rifai et al. |
| 8,406,905 | B2 | 3/2013 | Gao |
| 2003/0120360 | A1* | 6/2003 | Yasui ................... G05B 13/042 700/29 |
| 2004/0117042 | A1 | 6/2004 | Jackson et al. |
| 2006/0101402 | A1 | 5/2006 | Miller et al. |
| 2009/0143871 | A1* | 6/2009 | Gao ........................ G05B 13/04 700/29 |
| 2014/0351658 | A1* | 11/2014 | D'Ambrosio ....... G06F 11/3055 714/47.2 |
| 2015/0280986 | A1 | 10/2015 | Abuan et al. |
| 2016/0146118 | A1* | 5/2016 | Wichmann ............ F01D 21/003 701/100 |
| 2016/0147201 | A1 | 5/2016 | Crncich-DeWolf et al. |
| 2016/0330225 | A1 | 11/2016 | Kroyzer et al. |
| 2017/0269562 | A1 | 9/2017 | Dutta et al. |
| 2017/0315523 | A1 | 11/2017 | Cross et al. |
| 2017/0364043 | A1* | 12/2017 | Ganti ..................... G05B 17/02 |
| 2018/0087984 | A1 | 3/2018 | Hagelin et al. |
| 2018/0181111 | A1 | 6/2018 | Cussonneau et al. |
| 2019/0146477 | A1* | 5/2019 | Cella ..................... H04B 17/318 702/188 |
| 2019/0265688 | A1 | 8/2019 | Shahroudi |

OTHER PUBLICATIONS

Davis et al., "Controllability, Observability, Realizability, and Stability of Dynamic Linear Systems," Electronic Journal of Differential Equations, Jan. 23, 2009, 2009(37):1-32.

Debs et al., "A Dynamic Estimator for Tracking the State of a Power System", Transactions on Power Apparatus and Systems, 1970, 7, pp. 1670-1678.

Ernst et al., "The Daikon System for Dynamic Detection of likely Invariants", Science of Computer Programming, 2007, 69(1-3), pp. 35-45.

Flore et al., "Network anomaly detection with the Restricted Boltzmann Machine", Neurocomputing, 2013, 122, pp. 13-23.

Garcia-Teodoro et al., "Anomaly-based network intrusion detection: Techniques, systems and challenges." Science Direct, computers & security, Feb. 1, 2009, 28(1-2):18-28.

International Search Report and Written Opinion in International Application No. PCT/US2019/018536, dated May 20, 2019, 23 pages.

Lee et al., "Prognostics and Health Management Design for Rotary Machinery Systems—Reviews, Methodology and Applications", Mechanical Systems and Signal Processing, 2014, 42(1-2), pp. 314-334.

Reiger et al., "Resilient Control System Execution Agent (ReCoSEA)", 5th International Symposium on Resilient Control Systems, 2012, pp. 143-148.

Rieger et al., "Resilient control system execution agent (ReCoSEA)." Resilient Control Systems (ISRCS), 5th International Symposium on Aug. 14, 2012, pp. 143-148.

Saez et al., "Real-time Manufacturing Machine and System Performance Monitoring using Internet of things", IEEE Transactions on Automation Science and Engineering, 2018, 99, pp. 1-14.

Shahroudi et al., "Servo control of the GS16 Turbine Gas Metering Valve by Physics-Based Robust Controller Synthesis." Journal of Dynamic Systems, Measurement, and Control, Sep. 1, 2008, 130(5):051008, 19 page.

Shahroudi, "A Perspective on Future Directions in Intelligent Health Control of Gasturbines and Auxiliaries." ASME 1999 International Gas Turbine and Aeroengine Congress and Exhibition, Jun. 7, 1999, pp. V004T04A006-V004T04A006, American Society of Mechanical Engineers, 8 pages.

Shahroudi, "Robust Servo Control of a High Friction Industrial Turbine Gas Valve by Indirectly Using the Standard μ-Synthesis Tools." IEEE transactions on control systems technology, Nov. 2006, 14(6):1097-104.

Solihin et al., "Robust Controller Design for Uncertain Parametric Systems Using Modern Optimization Approach," 2011 4th International Conference on Mechatronics (ICOM), May 17-19, 2011, 6 pages.

Tandon et al., "Condition Monitoring of Rotary Machines", Condition Monitoring and Control for Intelligent Manufacturing, 2006, pp. 109-136.

Yoe, "Modelling and control of dynamical systems: numerical implementation in a behavioral framework." Springer, Jun. 24, 2008, 33 pages.

Zhou et al., "Robust and optimal control." New Jersey: Prentice hall, Dec. 11, 1996, pp. 45-53.

PCT International Preliminary Report on Patentability in International Appln. No. PCT/US2019/018536, dated Sep. 3, 2020, 16 pages.

\* cited by examiner

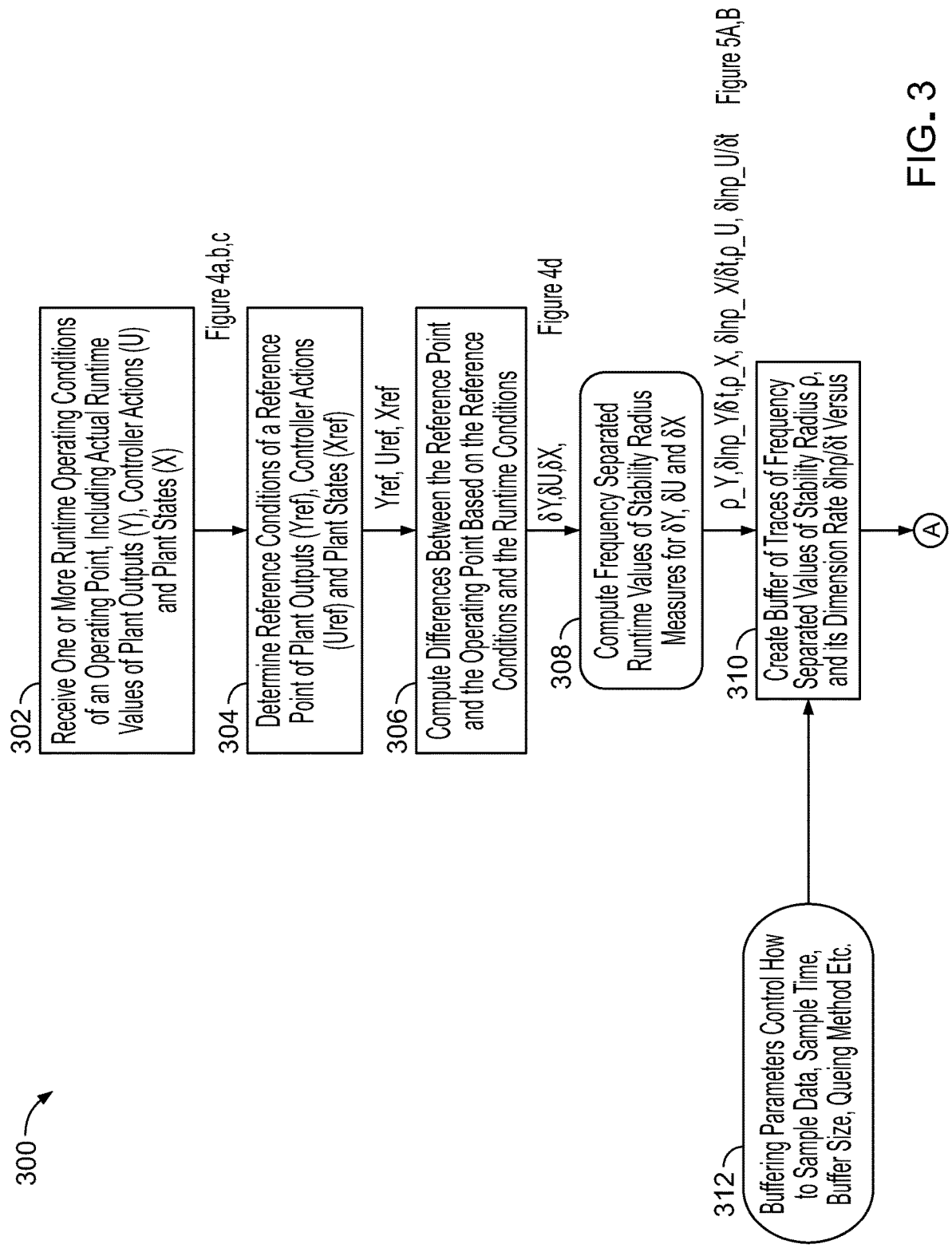

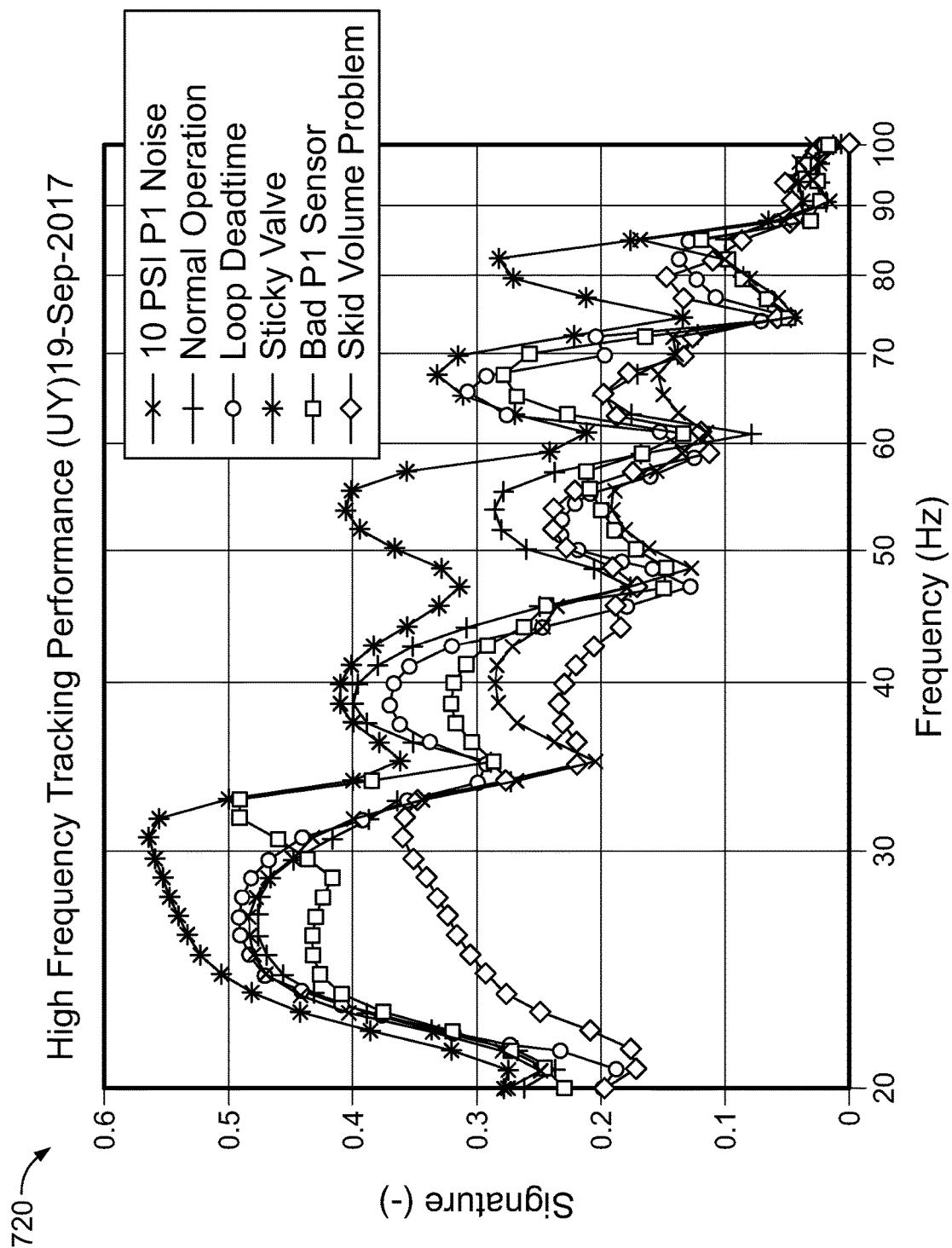

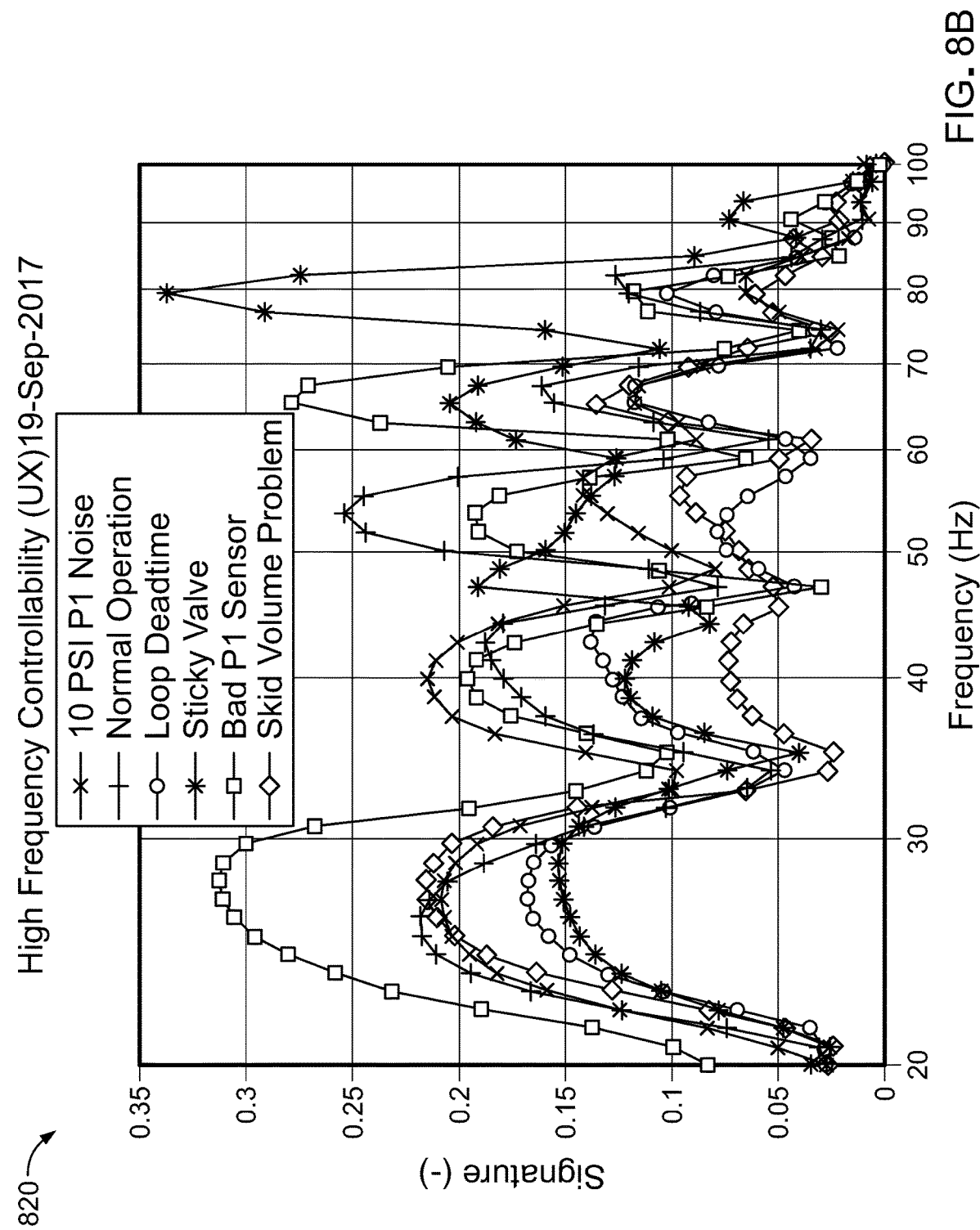

ANOMALY DETECTION AND ANOMALY-BASED CONTROL

BACKGROUND

Typically, controller synthesis and analysis work is done up front prior to programming the controller. The requirements typically include the specification of one or more of the following: operating envelope, operating conditions, sensor uncertainties, actuator uncertainties, plant dynamics, stability and performance (tracking), stability and performance robustness, computation burden (to fit target hardware), redundancy, detection and avoidance of specified faults.

Typically, after synthesis and analysis, various tests such as Hardware-in-the-Loop (HiL), Software-in-the-Loop (SiL), Model-in-the-loop (MiL), X-in-the-loop (XiL) (where X is a generic representation of any piece of the system that will be tested in the loop) tests are performed to validate that the controller and the equipment being controlled are working properly, followed by field evaluations. Once the product is released and in operation, the architecture of the controller is typically fixed (or switches among pre-determined architectures), which may not be adequate.

For example, turbine fuel valves controlled by a controller may exhibit robustness problems in the field, causing the turbine to shut down, or causing the operator to return the failing valve to the manufacturer for inspection. Upon inspection by the manufacturer under controlled conditions, the valve may not show any anomalies and pass End-of-Line (EOL) qualification tests, giving the appearance of nothing wrong with the returned valve. The issue may later be found to be caused by friction whose value is well outside of the normal expected range during the design of the valve. The initial control algorithm may assume a particular friction value in the middle of the expected range. However, when the friction becomes very low or very high, instead of continuing to stabilize the valve, the controller actually tends to excite the mechanical resonant modes and actually becomes part of the problem. This is an example of a problem of controllers, when the plant or equipment physics diverges significantly away from the norm or assumed range.

Robust control theory may fix the above problem by not assuming a nominal plant so that the plant (or equipment) is not required to remain close to nominal during operation. To fix the above problem, a very stiff algorithm is designed to be as insensitive as possible to friction disturbances. Friction is allowed to range from zero to max torque capability of the valve, using a particular industrial implementation of the robust control methodology.

As good as a robust controller is, it can be confused (e.g. have difficulty providing stability and control), like all other controllers, if the basic electro-mechanical physics of the valve (or other equipment) changes or appears to change due to, for example, an undetected position sensor malfunction, undetected blown electronic component or a cyber-attack. There is a long list of events that can confuse controllers. A confused controller is one that is no longer part of the solution of stabilizing and tracking. A confused controller can often also become part of the problem, i.e., where the control actions are actually driving instability.

Confused controllers have been very hard to identify at run time until there is major visible or obvious damage. Confused controllers have typically not been able to self-detect their confusion. What they can detect is whether a pattern in I/O, or a piece of code, matches or mismatches a known identified pattern or model. However, this classical approach to fault detection cannot guard against unanticipated or undetected malfunctions, including those caused by a cyber-attack.

SUMMARY

The present disclosure describes anomaly detection for controllers and anomaly-based control of systems (e.g., cyber physical systems).

In an implementation, For example, in a first implementation, a plant control system comprises a plant system comprising one or more pieces of equipment; and a control system controlling the plant system. The control system comprises one or more computers and one or more computer memory devices interoperably coupled with the one or more computers and having tangible, non-transitory, machine-readable media storing one or more instructions that, when executed by the one or more computers, perform one or more following operations.

Runtime conditions of an operating point of the plant control system are received. The runtime conditions of the operating point comprise a runtime state of the plant system, a runtime output of the plant system, and a runtime control action applied to the plant system. Reference conditions of a reference point corresponding to the operating point are determined. The reference conditions of the reference point comprise a reference state of the plant system, a reference output of the plant system, and a reference control action applied to the plant system. Differences between the reference point and the operating point are computed based on the reference conditions and the runtime conditions. The differences comprises: a state difference between the runtime state and the reference state of the plant system, an output difference between the runtime output and the reference output of the plant system, and a control action difference between the runtime control action and the reference control action applied to the plant system. A stability radius measure of the state difference, a stability radius measure of the output difference, and a stability radius measure of the control action difference are computed.

An observability anomaly indicator is determined based on a first spectral correlation between the stability radius measure of the output difference and the stability radius measure of the state difference. The first spectral correlation is computed over a first frequency range. The observability anomaly indicator indicates a likelihood of an anomaly occurring in the plant control system with respect to observability. The observability indicates an ability of the control system to estimate a state of the plant system based on a measured output of the plant system.

An observability health indicator is determined based on a second spectral correlation between the stability radius measure of the output difference and the stability radius measure of the state difference. The second spectral correlation is computed over a second frequency range. The observability health indicator indicates a likelihood of a normal operation of the plant control system with respect to the observability. The second frequency range is different from the first frequency range.

A tracking performance anomaly indicator is determined based on a third spectral correlation between the stability radius measure of the output difference and the stability radius measure of the control action difference. The third spectral correlation is computed over a third frequency range. The tracking performance anomaly indicator indicates a likelihood of an anomaly occurring in the plant control system with respect to tracking performance. The tracking performance measures an ability of the control system to track a set point.

A tracking performance health indicator is determined based on a fourth spectral correlation between the stability radius measure of the output difference and the stability radius measure of the control action difference. The fourth spectral correlation is computed over a fourth frequency range. The tracking performance health indicator indicates a likelihood of a normal operation of the plant control system with respect to the tracking performance. The fourth frequency range is different from the third frequency range.

A controllability anomaly indicator is determined based on a fifth spectral relationship between the stability radius measure of the control action difference and the stability radius of the state difference. The fifth spectral correlation is computed over within a fifth frequency range, wherein the controllability anomaly indicator indicates a likelihood of an anomaly occurring in the plant control system with respect to controllability. The controllability indicates an ability of the control system to impact a state of the plant system.

A controllability health indicator is determined based on a sixth spectral relationship between the stability radius measure of the control action difference and the stability radius of the state difference. The sixth spectral correlation is computed over a sixth frequency range. The controllability health indicator indicates a likelihood of a normal operation of the plant control system with respect to the controllability. The fifth frequency range is different from the sixth frequency range.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. First, the disclosed techniques can guard against unanticipated or undetected malfunctions while only requiring runtime live data. There is no need to incur the cost of collecting, integrating, and deep learning from fleets, for example. This benefits device manufacturers and suppliers who are trying to capture value by adding smart functionality to their devices, compared to, for example, providing data to supervisory systems that do not allow them to capture much of the value generated from such data.

Second, the disclosed techniques can allow all learning, even artificial learning, happening live inside each smart system, subsystem or partition of the system. This is compatible with distributed controls, products, and systems.

Third, the disclosed techniques can reduce computational complexity, especially for complex systems that have many components with significant none-linear relationships among them. The disclosed techniques allow the systems to detect anomalies and apply corrective actions without the complexity of having to consider the enormous number of permutations of faults and identifying the cause and effect of these faults.

Fourth, the disclosed techniques allow anomaly-based adaptation that does not require system identification. Therefore, there is no need to perturb the plant in order to learn plant responses. Perturbing a plant that is breached or damaged can make the controller part of the problem, not the solution.

Fifth, the disclosed techniques can be implemented into dedicated electronic circuits or components embedded in smart devices. This can bring computational advantages in addition to being able to place the component in a protected safe location behind physical barriers. As such, the component added to detect a breach or damage, is itself protected from breach or damage. Other advantages will be apparent to those of ordinary skill in the art.

The details of one or more implementations of the subject matter of this specification are set forth in the Detailed Description, the Claims, and the accompanying drawings. Other features, aspects, and advantages of the subject matter will become apparent from the Detailed Description, the Claims, and the accompanying drawings.

DESCRIPTION OF DRAWINGS

FIG. 7B is a data plot illustrating spectral correlations in a high frequency range (20~100 Hz) for computing the tracking performance anomaly signature, according to an implementation of the present disclosure.

FIG. 8B is a data plot illustrating spectral correlations in a high frequency range (20~100 Hz) for computing the controllability anomaly signature, according to an implementation of the present disclosure.

Like reference numbers and designations in the various drawings indicate like elements.

DETAILED DESCRIPTION

Figure 1:
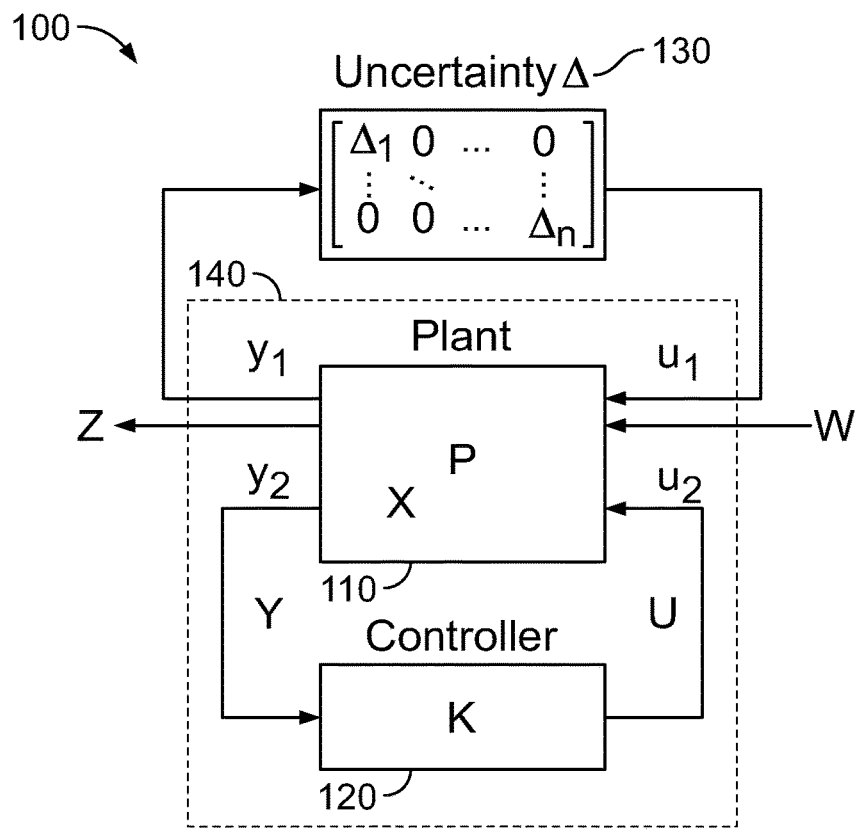
FIG. 1 is a block diagram illustrating an example plant control system, according to an implementation of the present disclosure.

The following detailed description describes anomaly detection and anomaly-based control, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, details unnecessary to obtain an understanding of the described subject matter have been omitted so as to not obscure one or more described implementations with unnecessary detail, and inasmuch as such details are within the skill of one of ordinary skill in the art. The present disclosure is not intended to be limited to the described or illustrated implementations, but to be accorded the widest scope consistent with the described principles and features.

Most of control theory today applies to tools and techniques to synthesize and analyze during development. At run time or in operation, there is currently very little support from control theory. So existing control theory assumes that the systems architecture is fixed or reasonably well known at all the operating points at run time. If this assumption is violated, existing control theory does not offer much to keep the system stable or performing well. In some implementations, the controller can become part of the stability and performance problem, not the solution to it.

Scenarios occur where a cyber or physical attack, event, or degradation makes a system unstable because the control philosophy, theory and tools do not handle run time deviations at run time. For example, an advanced robust control running turbine and engine valves is insensitive to bounded variation in friction, fluid quality, temperature, or pressure. The control theory however does not have run time metrics that can identify an unknown security breach, sensor failure, actuator failure, or change in the plant physics or architecture.

One way to address the problem is to collect a large amount of historical operational and live data from valves, turbine skids, or fleets of turbines, etc., and then analyze them with statistical and deep learning algorithms to extract faulty and healthy signatures or models and program them into the robust controller. Collecting field data that contains healthy signatures and all the faults of interest has a lot of practical hurdles. Moreover, even if resources and time were spent for the "known" faults, a brand new virus would require additional effort to collect data and analyze.

Example techniques for anomaly detection and anomaly-based control are disclosed. The described techniques can perform control-oriented anomaly detection that detects anomalies that may result from wear and tear, physical failures, cyber-attacks, or other sources, without requiring a vast amount of historical and live data. The described techniques can provide run time measures of stability, performance, robustness, controllability, observability, etc.

Anomalies are not the same as faults. Faults are typically known errors or patterns learned from a large amount of data. The data can include, for example, historic and live data from components, systems and fleets, or (physical)

models extracted from them. For example, artificial intelligence (AI) and deep learning algorithms in the hands of multi-disciplinary and domain experts may be able to generate solutions to the faults from the data, but typically require a large number of experts with major infrastructure to succeed. In some implementations, timely detection, prediction, and avoidance of costly consequences of component faults are required. In some implementations, supervisory and embedded control algorithms of smart valves can then detect and potentially avoid the costly consequences of a practical set of previously identified or known faults. In complex systems, it is usually not practical to guard against every possible permutation and combination of failures or adverse dynamic effects. For example, when the cause is an unknown virus or cyber-attack, it is not clear which sensor, actuator, or piece of the supervisory or embedded control algorithm has been compromised. Existing techniques may not be able to effectively detect or respond to unknown causes when the cause is an unknown change in the physics or behavior of a sensor, actuator, burst valve, leaky valve, sticky valve, or external physical damage.

Anomalies can include such unknown effects or failures, which are different from faults that have a known identified behavioral pattern or footprint (for example, stored in memory). Anomaly-based control does not require the knowledge of the root cause of malfunctions. They may have been caused by a cyber-attack, incorrect operation of the system, human error, failure or a physical accident, or any other source. It is sufficient to have run time measures that reflect to what degree major attributes of the controller, such as, Observability, Controllability and Tracking Performance are healthy or anomalous.

Anomaly-based control does not require on-line identification of the plant at run time. In some implementations, the anomaly-based control only requires the typical or normal excitation of the plant and the corresponding plant output that is available at run time. This is in contrast to existing adaptive controllers that need to identify the plant model at run time in order to be able to adapt or modify the control algorithm to match. Unlike the existing adaptive controllers, the anomaly-based control does not require that the input to the plant is rich enough or contains the range of frequencies that excites all or most of the dynamic response for proper identification. The anomaly-based control does not require the inputs to be perturbed at various frequencies on purpose or the plant to be purposely perturbed away from the normal commanded response to learn the new plant response at run time.

In some implementations, by shifting focus towards anomalies that impact real time control loops rather than faults, the described techniques provide relief from collecting, communicating, storing, mining, and learning from the vast amount of historical and live data in order to perform anomaly detection. In some implementations, the described techniques only rely on a subset of live data that is typically embedded in smart devices, such as electronically controlled valves (with embedded sensors and control software), distributed controllers, or smart fueling skids for gas turbines.

The described techniques can be used in various areas, such as cyber-security, Internet-of-Things (IoT), and distributed controls. For example, the described techniques can realize cyber threat detection and resistance, independent measures of health and anomaly in sensing, actuation and control logic of components, and other functionalities in an efficient and effective manner, without requiring investment in collecting historical or field data or deep learning or major (physics)-based models. The described techniques allow manufacturers or suppliers of smart or distributed control components to add into IoT devices (e.g., smart devices) one or more components (e.g., hardware with embedded control and anomaly detection software) that achieve one or more of the above functionalities. The described techniques allow manufacturers and/or suppliers to deliver, create, and capture many advantageous features without the cost and complexity of dealing with exploding amounts of data in the vast interconnection of devices in the IoT era. For example, the described techniques can be implemented as the embedded software of smart devices for anomaly detection. In some implementations, the described techniques only require live or run time data to detect live anomalies as a result of, for example, a cyber-security breach. As such, the described techniques can create a new layer of defense against viruses or hacks that still get through the existing hardware and software gates.

In some implementations, the described techniques detect health and anomaly in controllability, observability, and tracking performance of control loops at run time, without requiring historical data or pre-recorded signatures. Since a control system can be architected from a set of control systems, each containing actuation, sensing, control logic, input, output, and other components, in some implementations, the described techniques can recursively drill down to detect anomalies of the components of the control system as well.

FIG. 1 is a block diagram illustrating an example plant control system 100, according to an implementation of the present disclosure. The plant control system 100 can be of a robust controller controlling a plant with uncertainties. As illustrated, the plant control system 100 includes a plant system P 110 controlled by a control system or controller K 120. The example plant control system 100 can form an example robust controller architecture with a goal of designing the controller K 120 such that stability and performance of the plant system P 110 remains graceful or robust in the face of reasonably bounded plant uncertainties 130.

As shown in FIG. 1, U represents a control action, demand, or input to the plant system P 110; Y represents a plant output, e.g., a measured output of the plant system P 110; and X represents a plant state. X can include a directly measured state of the plant system P 110 or a representation of the state of the plant system P 110 inside the controller K 120. In an example nominal closed loop T 140, the plant system P 110 can receive a control action U output from the controller K 120 and returns an output Y that is fed into the control K 120 to generate an updated control action U to the plant system P 110.

Z represents performance measures of the plant system P 110. In some implementations, Z can include performance measures controllability, observability, and tracking performance at run time. Observability is the ability of the controller to estimate the state X of the plant from the measured plant output Y and control action U. This ability is related to the sensing path (e.g., what is actually measured or sensed) and the (physical) architecture of the plant.

Controllability is a measure of the ability of the controller to reach, impact, or change the value of the state X of the plant. This ability is related to the actuation path (e.g., what the controller actuates or moves) and the (physical) architecture of the plant.

Tracking performance is a measure of the ability of the controller to keep the plant output Y on target through controller action U despite the disturbances W and uncertainties $\Delta$. It measures the performance of the controller to track commands or set points.

For an identified or known plant P and controller K, observability, controllability, and tracking performance can be easily calculated based on well-known control theory in textbooks. However, when there is an anomaly or unidentified failure in the plant system P and/or the controller K, such as what can happen to a real system infiltrated by a virus, the above three attributes can no longer be computed analytically or statistically by purely looking at the information available in K. This is because no sensor, actuator, model, or piece of code inside the controller can be assumed to be functioning properly or reflecting what is real. This disclosure thus provides a method to independently calculate indicators (e.g., probabilities) of health and anomalies of the three attributes of controllability, observability and tracking performance, from run time data without having to actually calculate controllability, observability, tracking performance or purposely perturb the plant input for plant identification.

Figure 2:
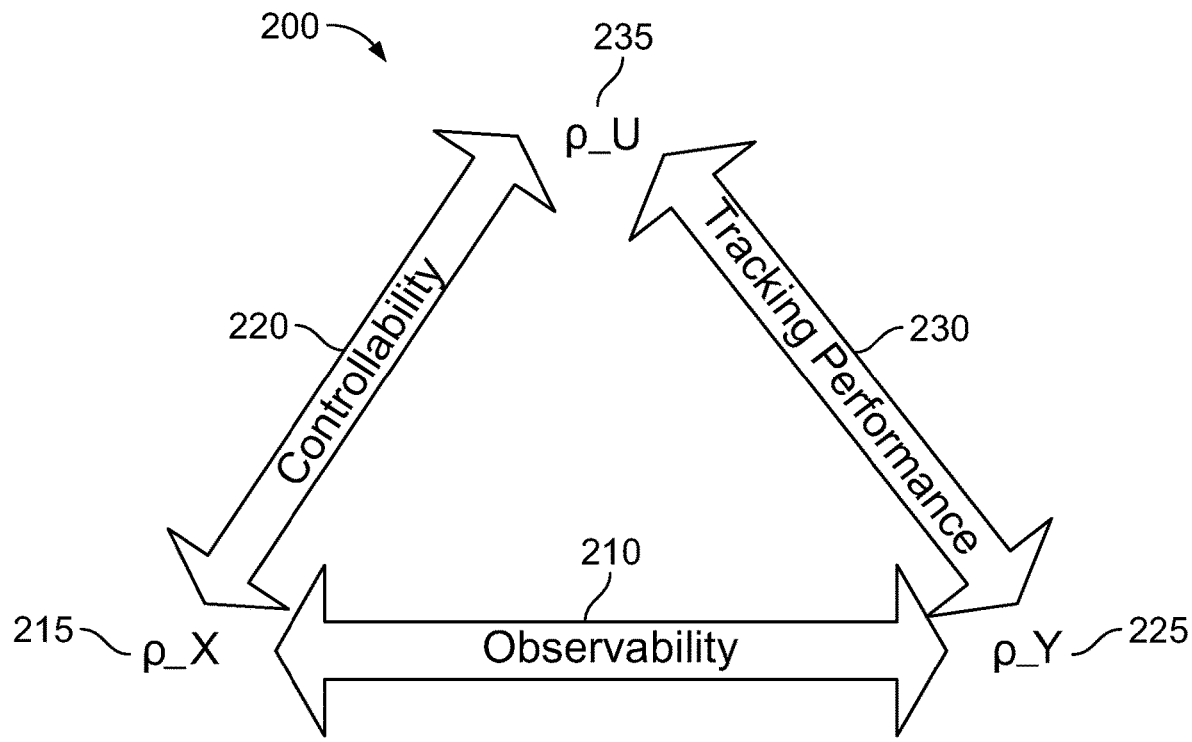
FIG. 2 is a block diagram illustrating example relationships among stability radii of plant state, plant output, and plant input with observability, controllability and tracking performance of a plant control system, according to an implementation of the present disclosure.

FIG. 2 is a block diagram 200 illustrating example relationships among stability radii of plant state, plant output, and plant input with observability, controllability, and tracking performance of a plant control system, according to an implementation of the present disclosure. In some implementations, run time or live differences in reference and actual values of plant inputs U, outputs Y and states X can be represented by:

$$\delta U = 100 * (U\text{ref} - U)/U\text{ref} \quad (1)$$

$$\delta Y = 100 * (Y\text{ref} - Y)/Y\text{ref} \quad (2)$$

$$\delta X = 100 * (X\text{ref} - X)/X\text{ref} \quad (3)$$

where ref indicates a reference value, which can include a commanded, expected, desired, or nominal value associated with the current operating condition of the plant and controller. The reference values can be computed, for example, from look-up tables or more statistical or pre-determined transfer functions. Equations (1)-(3) show runtime differences that are normalized by the reference values of plant inputs U, outputs Y and states X, respectively. In some implementations, the run time differences of plant inputs U, outputs Y and states X can be calculated in another manner, such as in a non-normalized form. The scalar 100 is to convert the result to percentage. In some implementations, the scalar is optional or some other scalars can be used.

A stability radius p of a dynamic variable a (written as $\rho\_\alpha$) is an instantaneous measure of how far a dynamic variable a is from rest, stable equilibrium or motionless none-moving state. $\rho_a$ can be defined as the diagonal size of a hyper-cube whose sides are defined by $\delta_\alpha$ (change of $\alpha$ relative to a reference value) and partial differentials of $\delta_\alpha$, $$\frac{\partial \delta\_\alpha}{\partial t}, \frac{\partial^2 \delta\alpha}{\partial^2 t}, \dots, \frac{\partial^n \delta\alpha}{\partial^n t}$$

where n is the order of the dynamics that characterizes the dynamic motion of $\alpha$:

$$\rho_a^2 = w_0 \delta_a^2 + w_1 \left(\frac{\partial \delta\alpha}{\partial t}\right)^2 + w_2 \left(\frac{\partial^2 \delta\alpha}{\partial^2 t}\right)^2 + \dots + w_n \left(\frac{\partial^n \delta\alpha}{\partial^n t}\right)^2, \quad (4)$$

$$\rho\_\alpha = \sqrt{w_0 \delta_a^2 + w_1 \left(\frac{\partial \delta\alpha}{\partial t}\right)^2 + w_2 \left(\frac{\partial^2 \delta\alpha}{\partial^2 t}\right)^2 + \dots + w_n \left(\frac{\partial^n \delta\alpha}{\partial^n t}\right)^2} \quad (5)$$

where $w_0, w_1, w_2, \dots, w_n$ are weighting or scaling factors.

As an example, if $\rho_\alpha$ is increasing, $\alpha$ is tending to move away from equilibrium and towards instability; if $\rho_\alpha$ is decreasing, $\alpha$ is tending to move towards equilibrium and away from instability. Note that a changing value of $\rho_\alpha$ is an indication of stability/instability tendency of $\alpha$, not an absolute conclusion about stability of $\alpha$. Perfectly stable dynamic systems exhibit various patterns of both tendencies at run time even if there is no anomaly. In principle, n is the maximum order required to capture the dynamics of interest for what a actually represents. For example, if $\alpha$ measures the position of the center of gravity of the car, then normally n=2 should be chosen only if one is interested in the motion of the car as a lumped mass. If a does not have a direct physical meaning, or if it is not certain about the order to choose, then choosing n=2 typically is a good start because it typically captures most, if not all, the effects of interest.

In anomaly-based control, three stability radii of interest can be considered: stability radius of plant states $\rho\_X$, stability radius of plant output $\rho\_Y$, and stability radius of plant input $\rho\_U$. Each of the three stability radii can be calculated according to Equations (4) or (5). Note that $\rho\_X$, $\rho\_Y$ and $\rho\_U$ do not individually enable conclusions about health or anomaly. However, the existence or lack of existence of a correlation (or coherence) between $\rho\_X$, $\rho\_Y$ and $\rho\_U$ contains necessary and sufficient information about the health and anomaly status of the three major attributes, observability, controllability, and tracking performance of the plant control system.

As shown in FIG. 2, vertices 215, 225 and 235 can represent the stability radii $\rho\_X$, $\rho\_Y$, and $\rho\_U$, respectively. The bi-directional arrows 210, 220 and 230 represent pair-wise relationships (e.g., spectral correlations) between each of the pairs of stability radii $\rho\_X$, $\rho\_Y$ and $\rho\_U$, respectively. The pairwise spectral correlation between two stability radii can be used to detect health and anomaly of each control attribute. For example, a spectral correlation between the stability radius of plant states $\rho\_X$ 215 and the stability radius of plant output $\rho\_Y$ 225 can be used to detect probabilities of health and anomaly of observability. A spectral correlation between the stability radius of plant states $\rho\_X$ 215 and the stability radius of plant input $\rho\_U$ 235 can be used to detect probabilities of health and anomaly of controllability. A spectral correlation of the stability radius of plant output $\rho\_Y$ 225 and the stability radius of plant input $\rho\_U$ 235 can be used to detect probabilities of health and anomaly of tracking performance.

In some implementations, one example way to calculate the spectral correlation is the magnitude-squared coherence. This is a function of frequency with values between 0 and 1 that indicates how well a signal x corresponds to a signal y at each frequency. The magnitude-squared coherence $C_{AB}(f)$ (e.g., mscohere function) between signals A and B, is a function of the power spectral densities, Paa(f) and Pbb(f), of a and b, and the cross power spectral densitb, Pab(f), of a and b, given bb:

$$C_{AB}(f) = \frac{|Pab(f)|2}{Paa(f)Pbb(f)}. \quad (6)$$

Paa(f) and Pbb(f), and Pab(f) can be obtained, for example, using standard power spectral density functions (e.g., MATLAB function Pab=cpsd(a, b, [ ], [ ], 128)). As an example, coherence $C_{XY}(f)$ can be calculated by substituting a and b in Equation (6) with the stability radius of plant states $\rho\_X$ 215 and the stability radius of plant output $\rho\_Y$ 225, respectively. Similarly, coherence $C_{UX}(f)$ can be calculated by substituting a and b in Equation (6) with the stability radius of plant input ρ_U 235 and the stability radius of plant states ρ_X 215, respectively. $C_{UY}(f)$ can be calculated by substituting a and b in Equation (6) with the stability radius of plant output ρ_Y 225 and the stability radius of plant input ρ_U 235, respectively. In some implementations, variations of the coherence or other functions can be used to calculate the spectral correlation.

In some implementations, due to scaling and other practical numerical issues, calculating a stability radius requires a lot of scaling "tricks" such as tuning, weighting, or re-scaling of the different order partial derivatives. This additional work would need to be repeated every time when applying anomaly-based control to a new application. The problem can be addressed by using a dimensionless derivative of the stability radius.

For example, a dimensionless rate of change of the stability radius of the plant state X can be approximated as:

$$\frac{\partial \ln(\rho\_X)}{\partial t} \approx \frac{\delta\_X \left(\frac{\partial \delta\_X}{\partial t}\right) + \left(\frac{\partial \delta\_X}{\partial t}\right)\left(\frac{\partial^2 \delta\_X}{\partial^2 t}\right)}{\delta\_X^2 + \left(\frac{\partial^2 \delta\_X}{\partial^2 t}\right)^2}. \quad (7)$$

Similar approximations can be applied to obtain dimensionless rates of change of the stability radii of the plant output $$\frac{\partial \ln(\rho\_Y)}{\partial t}$$

and plant input $$\frac{\partial \ln(\rho\_U)}{\partial t},$$

respectively. The above approximation example only keeps up to second order terms in addition to using unity weighting factors. In some implementations, the approximation can include higher or lower order terms and other weighting factors or variations. The dimensionless rate of change of the stability radius can make it easier to develop algorithms that work for a wide range of applications without (excessive) tuning. The dimensionless rate of change of the stability radius can also be used, as an alternative to the stability radius, to calculate probability of health and probability of anomaly metrics for observability, controllability, and tracking performance attributes. As such, the vertices of FIG. 2 can represent a stability radius (e.g., ρ_X, ρ_Y or ρ_U) or a dimensionless rate of change of the stability radius $$\left(\text{e.g., } \frac{\partial \ln(\rho\_X)}{\partial t}, \frac{\partial \ln(\rho\_Y)}{\partial t} \text{ or } \frac{\partial \ln(\rho\_Z)}{\partial t}\right)$$

or a combination of them.

TABLE 1

Example mathematical formulas for calculating instantaneous probability of health P(H) and probability of anomaly P(∀) metrics

| | Health Frequency Range (Hz) | | Probability of Health Metric |
|---|---|---|---|
| | $f_{h_{lo}}$ | $f_{h_{hi}}$ | $P(\mathcal{H})$ |
| Observability | 20 | 100 | $1 - \dfrac{\int_{f_{h_{lo}}}^{f_{h_{hi}}} |C_{XY}(f) - C_{XY_{normal}}(f)| \cdot df}{\int_{f_{h_{lo}}}^{f_{h_{hi}}} |C_{XY_{normal}}(f)| \cdot df}$ |
| Controlability | 1 | 20 | $1 - \dfrac{\int_{f_{h_{lo}}}^{f_{h_{hi}}} |C_{UX}(f) - C_{UX_{normal}}(f)| \cdot df}{\int_{f_{h_{lo}}}^{f_{h_{hi}}} |C_{UX_{normal}}(f)| \cdot df}$ |
| Tracking | 1 | 20 | $1 - \dfrac{\int_{f_{h_{lo}}}^{f_{h_{hi}}} |C_{UX}(f) - C_{UY_{normal}}(f)| \cdot df}{\int_{f_{h_{lo}}}^{f_{h_{hi}}} |C_{UY_{normal}}(f)| \cdot df}$ |
| | Anomaly Frequency Range (Hz) | | Probability of Anomaly Metric |
| | $f_{a_{lo}}$ | $f_{a_{hi}}$ | $P(\forall)$ |
| Observability | 1 | 20 | $\dfrac{\int_{f_{a_{lo}}}^{f_{a_{hi}}} |C_{XY}(f) - C_{XY_{normal}}(f)| \cdot df}{\int_{f_a}^{f_{a_{hi}}} |C_{XY_{normal}}(f)| \cdot df}$ |

TABLE 1-continued

Example mathematical formulas for calculating instantaneous probability of health P(H) and probability of anomaly P(∀) metrics

| | | | |
|---|---|---|---|
| Controllability | 20 | 100 | $\dfrac{\int_{fa_{lo}}^{fa_{hi}} \lvert C_{UX}(f) - C_{UX_{normal}}(f) \rvert \cdot df}{\int_{fa}^{fa_{hi}} \lvert C_{UX_{normal}}(f) \rvert \cdot df}$ |
| Tracking | 20 | 100 | $\dfrac{\int_{fa_{lo}}^{fa_{hi}} \lvert C_{UY}(f) - C_{UY_{normal}}(f) \rvert \cdot df}{\int_{fa}^{fa_{hi}} \lvert C_{UY_{normal}}(f) \rvert \cdot df}$ |

Table 1 shows example mathematical formulas for calculating instantaneous probability of health P($\mathcal{H}$) and probability of anomaly P($\forall$) metrics for the three control attributes, observability, controllability, and tracking performance, using the coherence function (e.g., $C_{XY}(f)$, $C_{UX}(f)$, $C_{UY}(f)$). For notational simplicity, $C_{XY}(f)$ represents the coherence between the stability radii ρ_X and ρ_Y, or the coherence between the dimensionless rates of change of the stability radii $$\frac{\partial \ln(\rho\_X)}{\partial t} \text{ and } \frac{\partial \ln(\rho\_Y)}{\partial t}.$$

So do coherences $C_{UX}(f)$ and $C_{UY}(f)$. In some implementations, the probability of health P($\mathcal{H}$) and probability of anomaly P($\forall$) for observability, controllability, and tracking performance can be computed based on some variations or in another manner.

As shown in Table 1, for each of the three control attributes, the probability of health P($\mathcal{H}$) and probability of anomaly P($\forall$) are calculated independently. In other words, the sum of the probability of health P($\mathcal{H}$) and probability of anomaly P($\forall$) are not necessarily 1. For each of the three control attributes, the probability of health P($\mathcal{H}$) and probability of anomaly P($\forall$) have respective frequency ranges (defined by $f_{h_{lo}}$ and $f_{h_{hi}}$, and $f_{h_{lo}}$, and $f_{h_{hi}}$ respectively). Respective frequency ranges can be determined, for example, based on a specification of a control problem or controller requirements which are application specific. As an example, for a skid system (e.g., a liquid fuel skid system 1200 in FIG. 12), if it is desirable to have good controllability and tracking performance of the pressure in the range of 1 to 20 Hz, a desired frequency range with good observability can be 20 to 100 Hz.

In some implementations, the frequency ranges of probability of health P($\mathcal{H}$) and probability of anomaly P($\forall$) are separated, not overlapping. For the example of the liquid fuel skid system 1200 in FIG. 12, the frequency range for computing the probability of health P($\mathcal{H}$) for observability is from 20 to 100 Hz; while the frequency range for computing the probability of anomaly V for observability is from 1 to 20 Hz. The frequency range for computing the probability of health P($\mathcal{H}$) for controllability is from 1 to 20 Hz; while the frequency range for computing the probability of anomaly P($\forall$) for controllability is from 20 to 100 Hz. The frequency range for computing the probability of health P($\mathcal{H}$) for tracking performance is from 1 to 20 Hz; while the frequency range for computing the probability of anomaly P($\forall$) for tracking performance is from 20 to 100 Hz. In some implementations, other values of the respective frequency ranges can be configured and used to compute the probability of health P($\mathcal{H}$) and the probability of anomaly P($\forall$).

In some implementations, spectral separation is performed to identify the relevant frequency range for computing the respective probability of health P($\mathcal{H}$) and the probability of anomaly P($\forall$) for observability, controllability, and tracking performance. In some implementations, differentiating signals directly can be very sensitive to signal noise and numerical effects. As such, differentiating worsens the signal to noise ratio. In some implementations, computing coherence prior to spectral separation can reduce the signal to noise. In some implementations, an efficient frequency separation or filtering technique can be implemented such that the states or signals used for filtering also directly represent the differential terms in the (log derivative) stability radius equation (e.g., Equation (7)).

Figure 3:
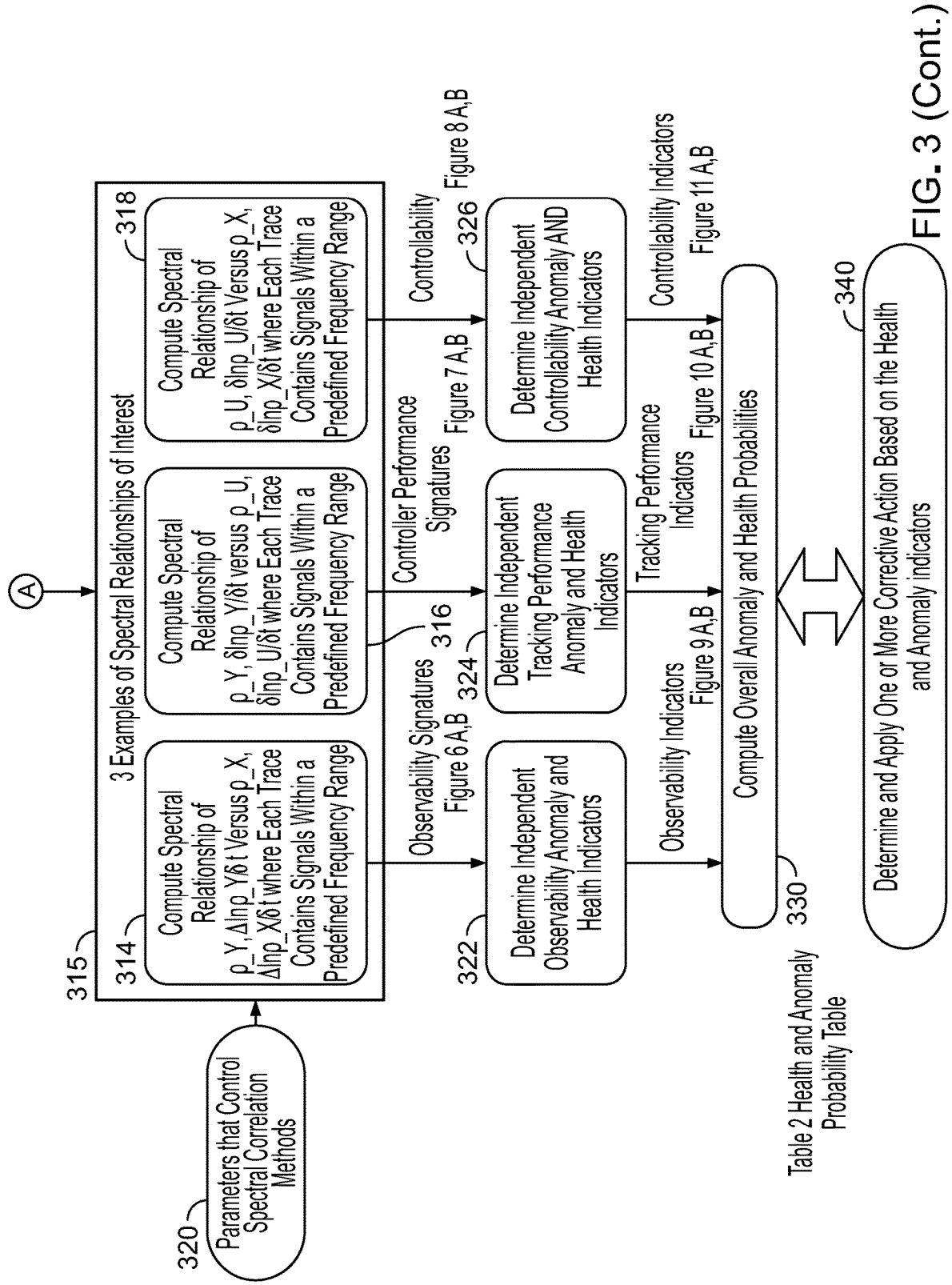
FIG. 3 is a flowchart illustrating an example of a computer-implemented method for anomaly detection and anomaly-based control, according to an implementation of the present disclosure.

FIG. 3 is a flowchart illustrating an example of a computer-implemented method 300 for anomaly detection and anomaly-based control, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, one or more runtime operating conditions of an operating point of a plant control system are received. The plant control system can include the example plant control system 100 as shown in FIG. 1. The plant control system can include a plant system and a control system controlling the plant system. For example, the plant control system can include a flight control system, wherein the plant system is the airplane and the control system controlling the airplane. In some other implementations, the plant system can include, for example, an electrical power generation plant, a vehicle (e.g., an aircraft, a ship, or an automobile), turbine system (e.g., land or marine gas turbine systems), or any subsystem thereof (e.g., fuel, air or combustion system of an aircraft).

The control system can include a computer-implemented system (including a software-based system), a mechanical system, an electronic system, or a combination thereof. For example, the control system can include one or more computers and one or more computer memory devices interoperably coupled with the one or more computers and having tangible, non-transitory, machine-readable media storing one or more instructions that, when executed by the one or more computers, perform one or more operations of the example method 300. The control system can control the plant system, for example, by sending instructions to one or more actuators to actuate valves operating in connection with one or more pieces of equipment of the plant system. In some implementations, the control system can achieve automatic control without any user input. In some implementations, the control system can include or receive user inputs and allow user feedback or intervention. The control system can be implemented, for example, as an imbedded control system or an individual control system that is separated from the plant system.

The plant system may include one or more types of equipment that operate in combination with valves, such as motors, transducers, sensors, or other physical devices. The plant system can also include one or more actuators that move, drive, control, actuate, or otherwise change operations of the one or more types of equipment. As an example, actuators can change operations of the one or more types of equipment, for example, by actuating (e.g., opening, closing, or moving) a valve of the plant system. An actuator can receive a control signal, for example, from a control system. The control signal can be electric, mechanical, thermal, magnetic, pneumatic, or hydraulic, manual, or a combination thereof. For example, the control signal can be electric voltage or current derived from instructions from a computer-implemented control system. The actuator can also have a source of energy. When the control signal is received, the actuator can respond by converting the energy into motion (e.g., mechanical motion) to change operations of the associated equipment by actuating (e.g., opening, or closing, or moving) a valve. In some implementations, the plant system can include one or more smart devices based on IoT technology and one or more smart actuators that dynamically change operations of the one or more smart devices, for example, based on electric or hydraulic control signals. For example, a flight control system can use smart actuators to actuate multiple smart devices on the aircraft.

In some implementations, the one or more runtime conditions of the operating point can include actual runtime values of a runtime state of the plant system (e.g., X), a runtime output of the plant system (e.g., Y), and a runtime control action applied to the plant system (e.g., U). In some implementations, the runtime operating conditions of the operating point can include other parameters such as current values of altitude, forward speed, and operating environmental conditions such as pressure, temperature, and controller set points, etc.

Figure 12:
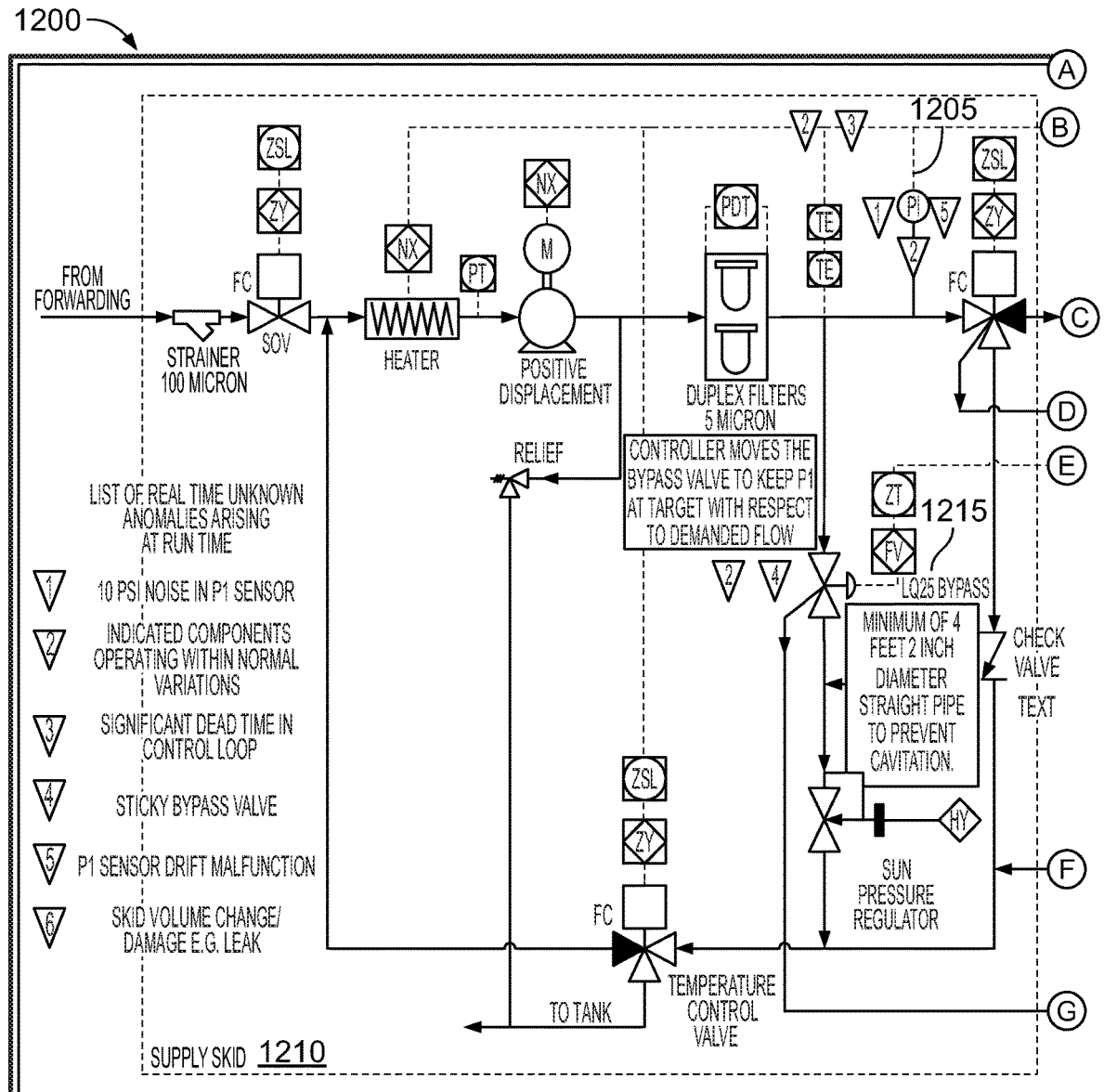
FIG. 12 is a block diagram illustrating an example liquid fuel skid system, according to an implementation of the present disclosure.
Figure 12:
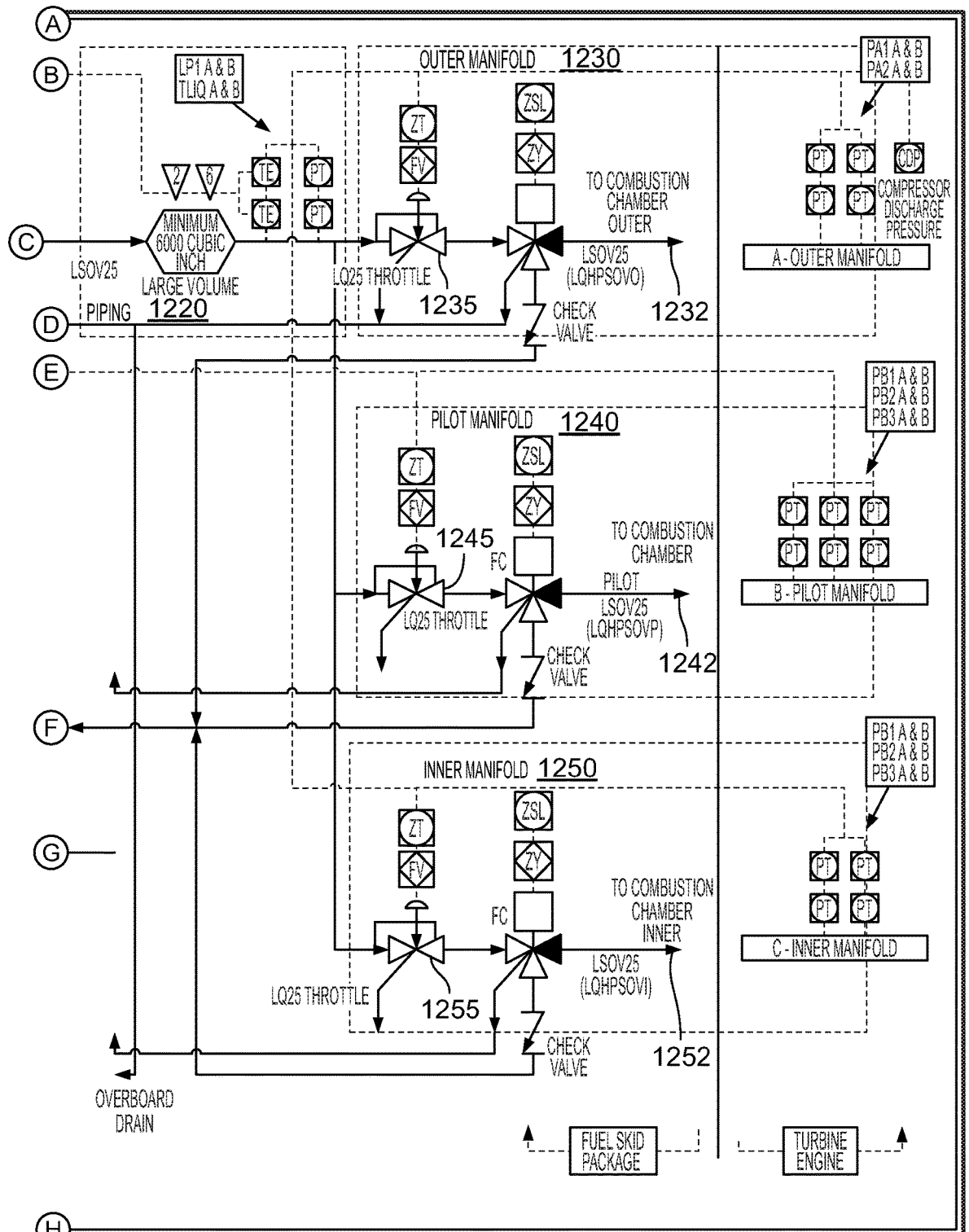

FIG. 12 is a block diagram illustrating an example liquid fuel skid system 1200, according to an implementation of the present disclosure. The example liquid fuel skid system 1200 is an example of a plant control system. The example liquid fuel skid system 1200 includes a plant system, a turbine fuel skid system, and a control system, a central skid controller, that controls the turbine fuel skid system, for example, by performing the example method 300. The example liquid fuel skid system 1200 includes a supply skid 1210, a piping subsystem 1220, an outer manifold 1230, a pilot manifold 1240, and an inner manifold 1250. The example liquid fuel skid system 1200 is configured to deliver accurate fuel flows to the three separate manifolds (or nozzle rings), the outer manifold 1230, the pilot manifold 1240, and the inner manifold 1250, that feed a combustion chamber (not shown) as denoted by arrows 1232, 1242, and 1252, respectively. The supply skid 1210 is responsible for closing the loop on supply pressure P1 (e.g., measured by P1 sensor 1205) via position control of the LQ25 bypass valve 1215. There is a large volume (i.e., long length of pipe 1220) between the supply skid 1210 and a metering skid that uses three LQ25 throttling valves 1235, 1245, and 1255 to control the flow delivered to the three manifolds 1230, 1240, and 1250 connected to fuel nozzle rings that in turn feed the combustion chamber.

A simulation has been developed that can mimic the following normal and anomalous operating conditions: (1) 10 psi noise in P1 Sensor 1205; (2) all components working with normal "healthy" bounds; (3) significant dead time in the P1 control loop; (4) sticky bypass valve 1215; (5) P1 sensor 1205 drift malfunction; and (6) skid volume change, damage or leak.

For simplicity, this simulation considers a single input or control action (e.g., Valve, the position of the LQ25 bypass valve 1215), a single output (e.g., P1m, the supply skid pressure measured by the P1 sensor 1205), and a single state (e.g., P1m, the supply skid pressure measured by the P1 sensor 1205) for the supply skid 1210 in each of the operating conditions. Note that in this case, for simplicity, the plant output and the plant state are the same. In general, a plant output can be a function of several plant states. For example, if the plant system is a car, plant states can include revolutions per minute (RPM), manifold pressure, velocity, etc. A plant output can include, for example, miles per gallon, which is a function of all these plant states. Additional or different parameters can be considered as the plant input or control action, plant state and plant output. Referring back to FIG. 3, from 302, method 300 proceeds to 304.

At 304, reference conditions of a reference point corresponding to the operating point are determined. The reference conditions of the reference point can include a reference state of the plant system (e.g., Xref), a reference output of the plant system (e.g., Yref), and a reference control action applied to the plant system (e.g., Uref). The reference conditions of the reference point can include a commanded, expected, desired, or nominal value associated with the current operating condition of the plant and controller. The reference values can be computed, for example, from look-up tables or more complex statistical or pre-determined transfer functions.

For the example of the liquid fuel skid system 1200 in FIG. 12, the reference control action applied to the plant system can be ValveCmd, representing the command (or set point) value of the LQ25 bypass valve 1215. The reference output of the plant system can be P1m, representing the measured value of the supply skid pressure (e.g., measured by the P1 sensor 1205). The reference state of the plant system can be P1est, representing the estimated value of the supply skid pressure (e.g., estimated through an ideal transfer function or an observer).

Figure 4A:
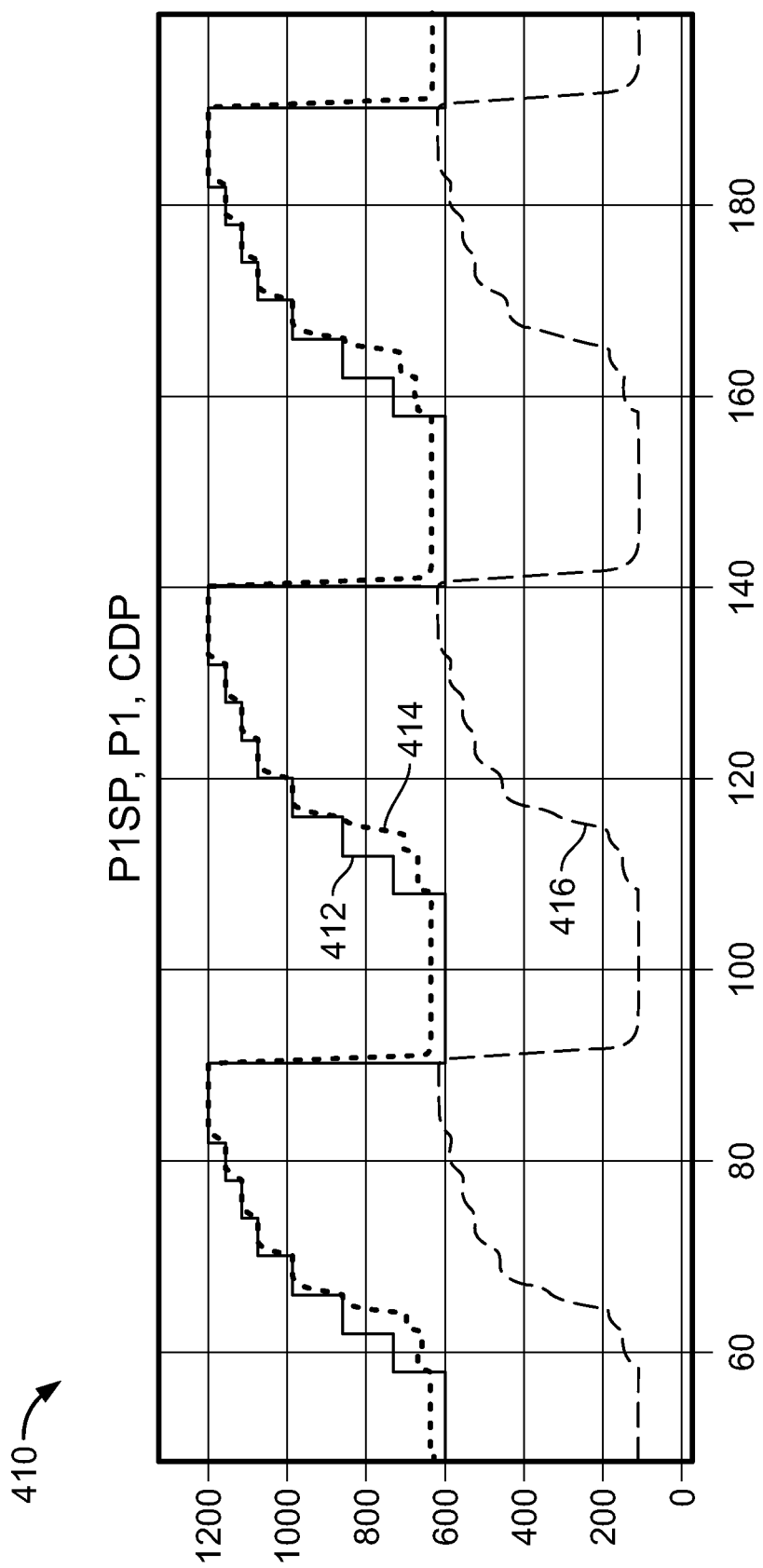
FIG. 4A is a data plot illustrating actual and reference runtime values of an example plant state, the supply skid pressure P1, under normal operation, according to an implementation of the present disclosure.

FIG. 4A is a data plot 410 illustrating actual and reference runtime values of an example plant state, the supply skid pressure P1, under normal operation, according to an implementation of the present disclosure. The horizontal axis represents time (in second (s)) and the vertical axis represents pressures (in psi). Curve 412 shows reference runtime values of plant state (e.g., a commanded supply pressure of P1 sensor). Curve 414 shows the actual runtime values of plant state P1. Note that under a normal operation the actual P1 response (represented by curve 414) is not identical, but reasonably close, to the reference P1 pressure (represented by curve 412). FIG. 4A also shows a compressor discharge pressure (CDP) in the turbine engine represented by curve 416.

Figure 4B:
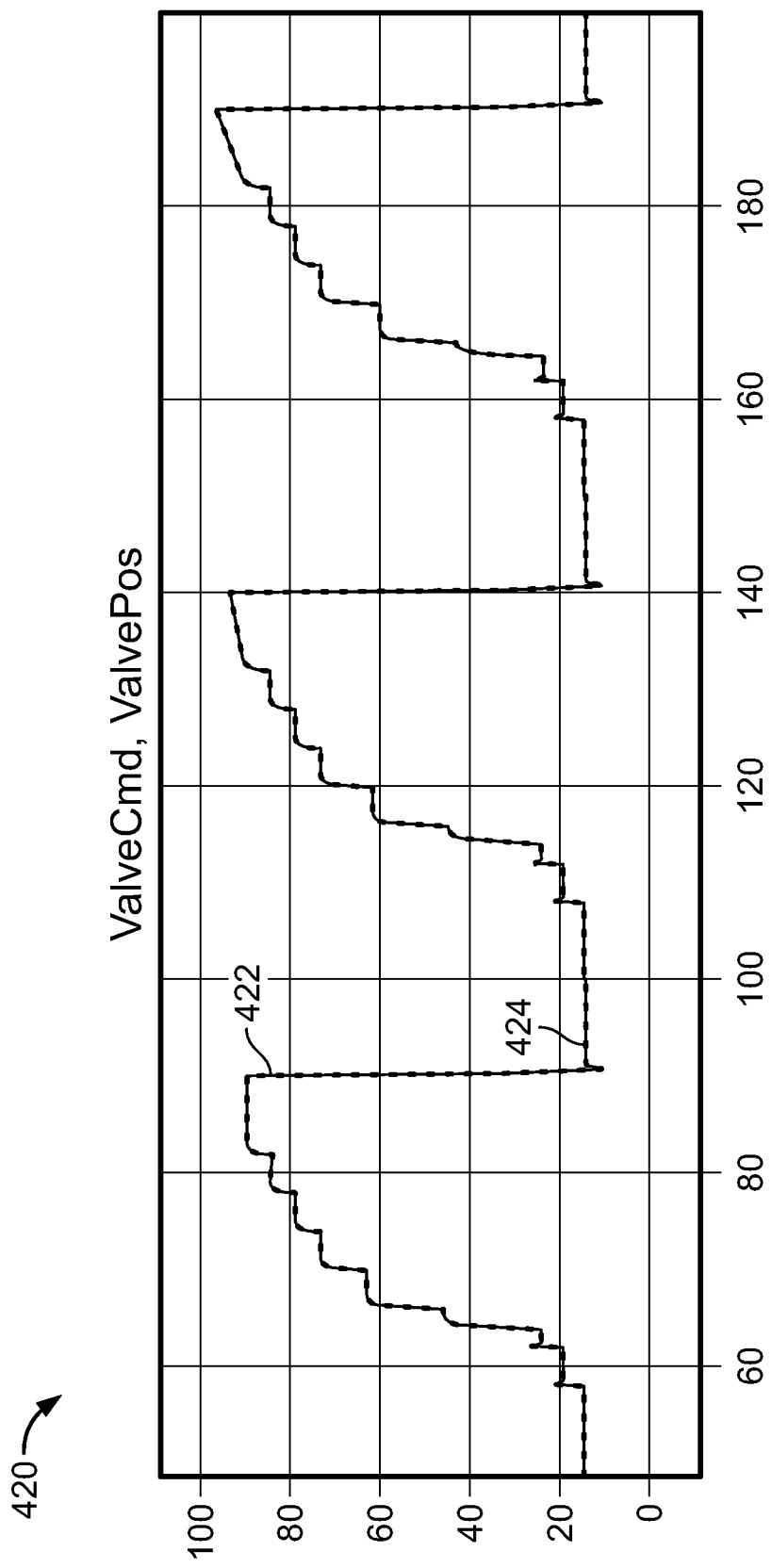
FIG. 4B is a data plot illustrating actual and reference runtime values of an example plant input or control action, the position of the LQ25 bypass valve 1215, under normal operation, according to an implementation of the present disclosure.

FIG. 4B is a data plot 420 illustrating actual and reference runtime values of an example plant input or control action, the position of the LQ25 bypass valve 1215, under normal operation, according to an implementation of the present disclosure. The horizontal axis represents time (in seconds (s)) and the vertical axis represents the valve position (in %). Curve 422 shows the reference or commanded runtime values valve position ValveCmd. Curve 424 shows the actual runtime values of valve position ValvePos. Note that the corresponding LQ25 bypass valve command (represented by curve 422) and response (represented by curve 424) are not identical during normal operation either.

Figure 4C:
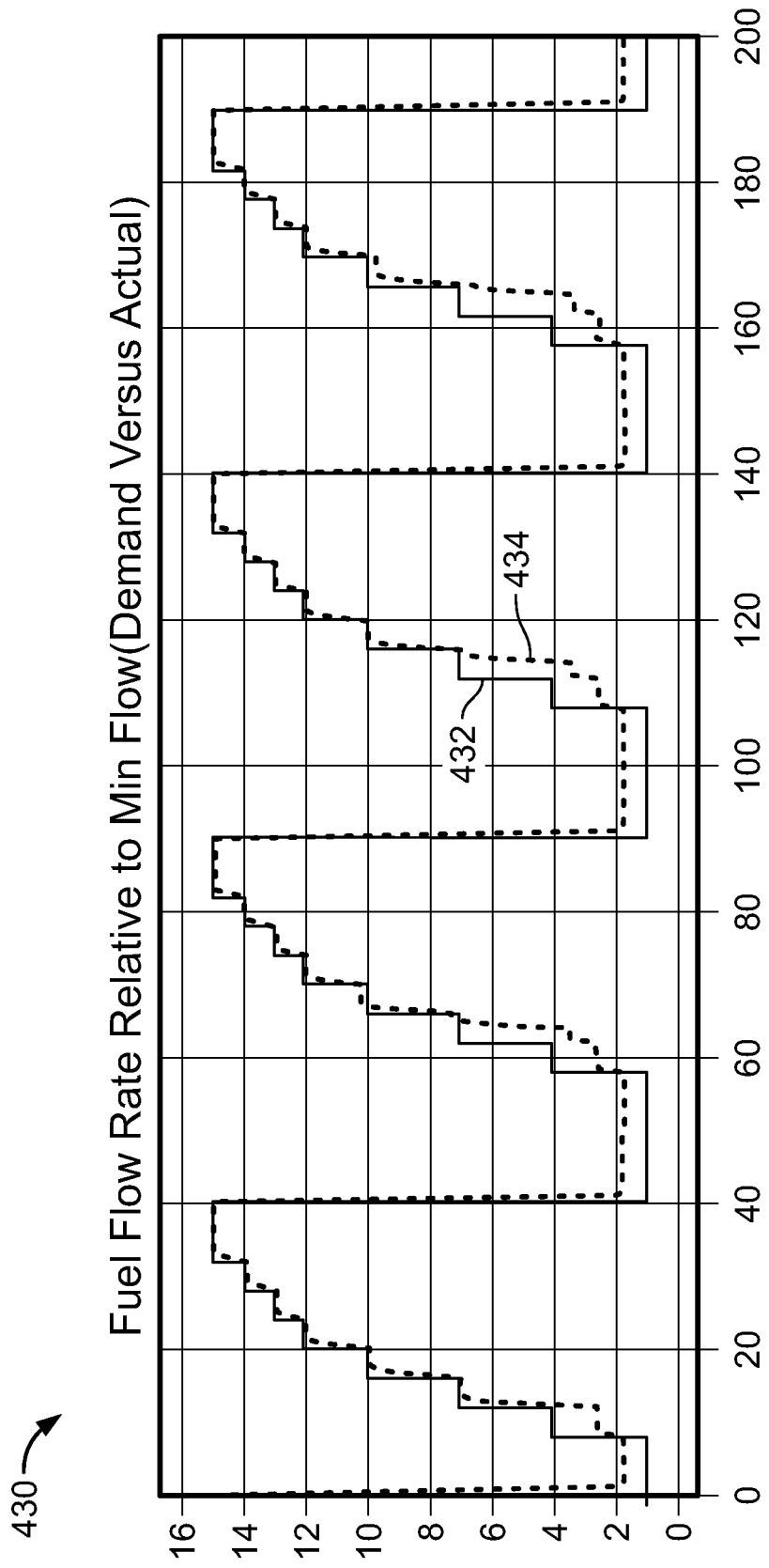
FIG. 4C is a data plot illustrating actual and reference runtime values of an example plant output, a nozzle fuel flow rate, according to an implementation of the present disclosure.

FIG. 4C is a data plot 430 illustrating actual and reference runtime values of an example plant output, a nozzle fuel flow rate, according to an implementation of the present disclosure. The horizontal axis represents time (in seconds (s)) and the vertical axis represents the nozzle fuel flow rate divided by the fuel flow rate at a minimal flow (in %). In some implementations, the fuel flow rate is measured in pounds per hour. FIGS. 4A to 4C show different variables that are inter related. For example, the pressure difference across a nozzle can determine the flow rate through the nozzle. Curve 432 shows reference or commanded runtime values of the nozzle fuel flow rate. Curve 434 shows the actual runtime values or response of the nozzle fuel flow rate. Referring back to FIG. 3, from 304, method 300 proceeds to 306.

At 306, differences between the reference point and the operating point are computed based on the reference conditions and the runtime conditions. The differences can include runtime differences that include, for example, a state difference between the runtime state and the reference state of the plant system (e.g., $\delta X$), an output difference between the runtime output and the reference output of the plant system (e.g., $\delta Y$), and a control action difference between the runtime control action and the reference control action applied to the plant system (e.g., $\delta U$). The runtime differences can be calculated, for example, according to Equations (1)-(3) or in another manner.

For the example of the liquid fuel skid system 1200 in FIG. 12, the three runtime differences can be calculated by substituting corresponding values into Equations (1)-(3):

$$\delta U = 100^*(\text{ValveCmd \%} - \text{Valve \%})/\text{ValveRef \%} \quad (8)$$

$$\delta Y = 100^*(P1\text{Cmd}_{psi} - P1m_{psi})/P1\text{Ref}_{psi} \quad (9)$$

$$\delta X = 100^*(P1m_{psi} - P1\text{est}_{psi})/P1\text{Ref}_{psi} \quad (10).$$

where the subscripts represent the units of each parameter, respectively.

Figure 4D:
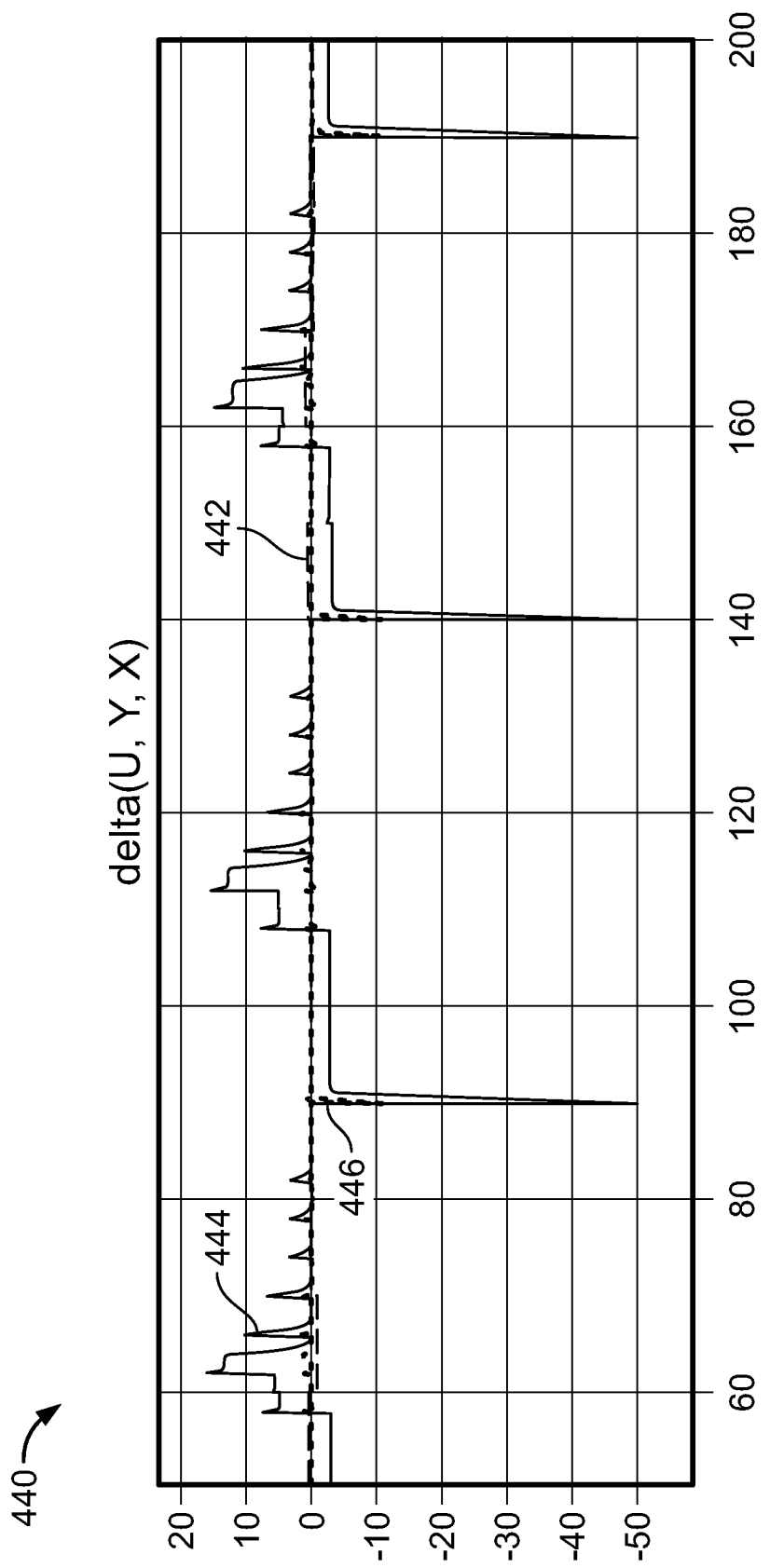
FIG. 4D is a data plot illustrating example runtime relative state difference $\delta X$ (in %), output difference $\delta Y$ (in %), and control action difference $\delta U$ (in %) of the plant system, according to an implementation of the present disclosure.

FIG. 4D is a data plot 440 illustrating example runtime relative state difference $\delta X$ (in %) 442, output difference $\delta Y$ (in %) 444, and control action difference $\delta U$ (in %) 446 of the plant system, according to an implementation of the present disclosure. The horizontal axis represents time (in seconds(s)) and the vertical axis represents the three relative differences where the values of 400% and 1200 psi are used for reference values of Valve Position and P1 respectively. Referring back to FIG. 3, from 306, method 300 proceeds to 308.

At 308, stability radius measures are computed. A stability radius measure is a run time metric that measures how far (or how close) a system is from stable equilibrium calculated from run time differences in relevant dynamic variables and their rates of change. The stability radius measures can include a stability radius measure of the state difference $\delta X$, a stability radius measure of the output difference $\delta Y$, and a stability radius measure of the control action difference $\delta U$. The stability radius measure can include one or more of a stability radius, a dimensionless derivative, or a log derivative rate of change of the stability radius, a similar metric or a combination of them. In some implementations, the stability radius can be computed according to Equation (4) or (5) or a variant thereof. The dimensionless rate of change of the stability radius can be computed according to Equation (7) or a variant thereof.

For example, the stability radius measure of the state difference can include one or both of a stability radius of the state difference (e.g., $\rho\_X$) and a dimensionless rate of change of the stability radius of the state difference $$\left(\text{e.g.,} \frac{\partial \ln(\rho\_X)}{\partial t}\right).$$

The stability radius of the state difference can include one or more orders of the rate of change of the stability radius of the state difference, for example, as shown in Equation (4) or (5). In some implementations, the stability radius of the state difference can include a weighted average of two or more orders of the rate of change of the stability radius of the state difference.

Similarly, the stability radius measure of the output difference can include one or both of a stability radius of the output difference (e.g., $\rho\_Y$) and a dimensionless rate of change of the stability radius of the output difference $$\left(\text{e.g.,} \frac{\partial \ln(\rho\_Y)}{\partial t}\right).$$

The stability radius of the output difference can include one or more orders of the rate of change of the stability radius of the output difference.

The stability radius measure of the control action difference can include one or both of a stability radius of the control action difference (e.g., $\rho\_U$) and a dimensionless rate of change of the stability radius of the control action difference $$\left(\text{e.g.,} \frac{\partial \ln(\rho\_U)}{\partial t}\right).$$

The stability radius of the state difference can include one or more orders of the rate of change of the stability radius of the control action difference.

In some implementations, the stability radius and the dimensionless rate of change of the stability radius are frequency separated. For example, a low pass, band pass, or band stop filtering of the output of Equation (5)-(7) can be used to compute the frequency separated runtime values of stability radius measures for $\delta Y$, $\delta U$ and $\delta X$. In some implementations, states of a filter can be used to directly represent the stability radius and its dimensionless rate of change.

Figure 5A:
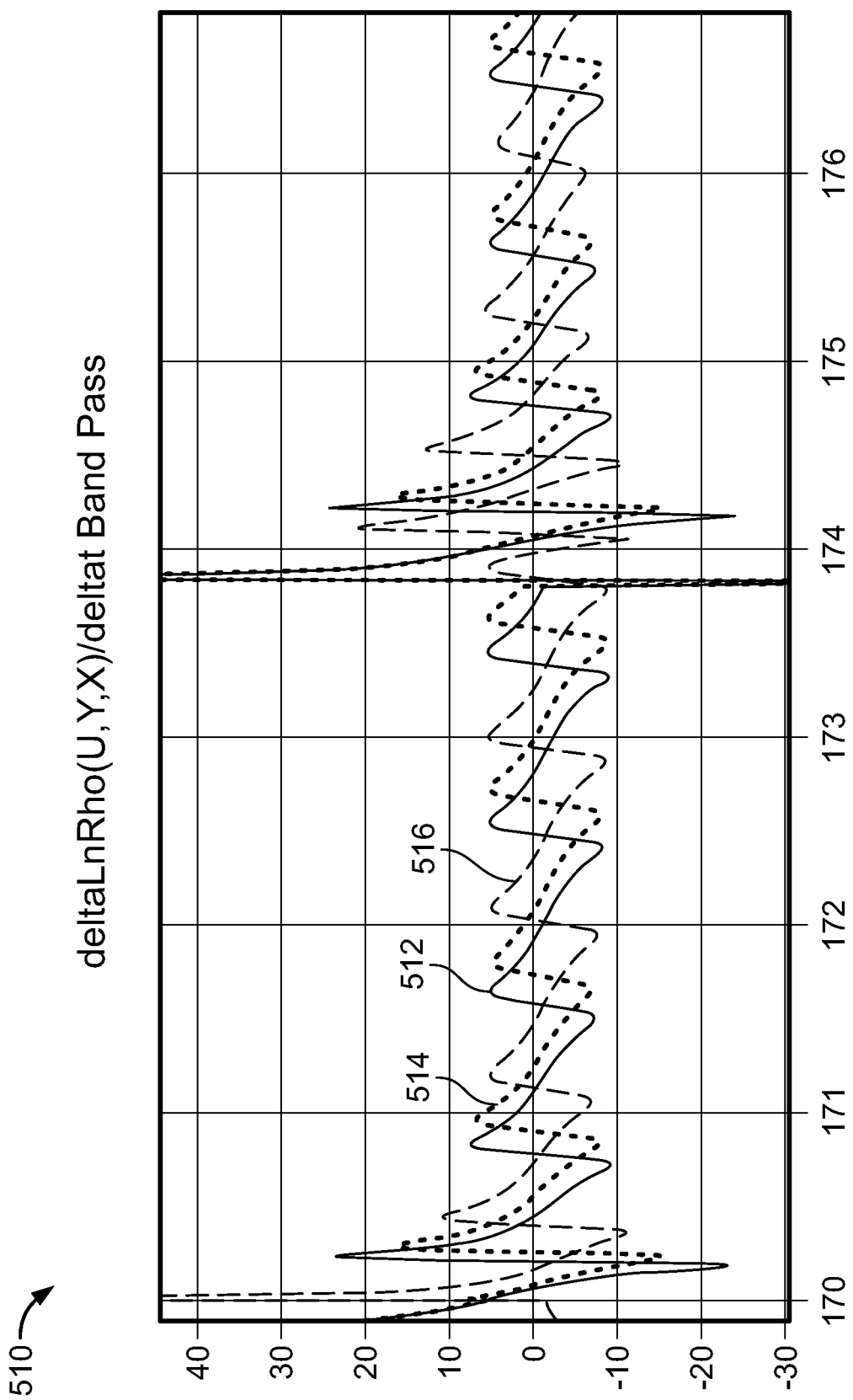
FIG. 5A is a data plot illustrating band pass computation of dimensionless rates of change of the stability radii in the frequency range from 1 to 20 Hz, according to an implementation of the present disclosure.

FIG. 5A is a data plot 510 illustrating band pass computation of dimensionless rates of change of the stability radii in the frequency range from 1 to 20 Hz, according to an implementation of the present disclosure. The horizontal axis represents time (in seconds (s)) and the vertical axis represents runtime frequency separated values of the dimensionless rate of change of stability radius for U, Y, and X.

Specifically, curve 512 represents the dimensionless rate of change of the stability radius of the control action difference, $$\frac{\partial \ln(\rho\_U)}{\partial t};$$

curve 514 represents the dimensionless rate of change of the stability radius of the plant output difference, $$\frac{\partial \ln(\rho\_Y)}{\partial t};$$

and curve 516 represents the dimensionless rate of change of the stability radius of the plant state difference, $$\frac{\partial \ln(\rho\_X)}{\partial t}.$$

Figure 5B:
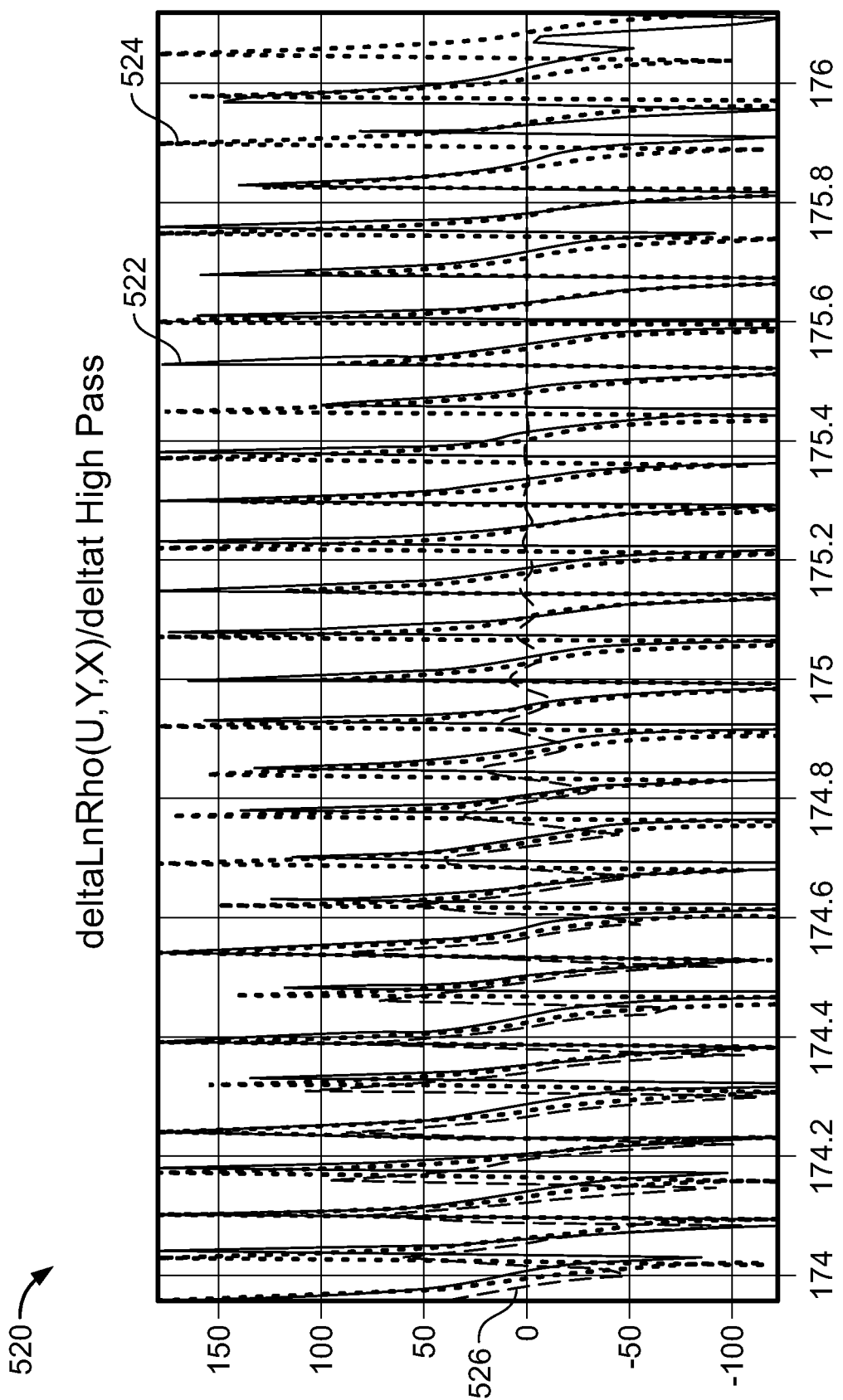
FIG. 5B is a data plot illustrating high pass computation of dimensionless rates of change of the stability radii in the frequency range above 20 Hz, according to an implementation of the present disclosure.

FIG. 5B is a data plot 520 illustrating high pass computation of dimensionless rates of change of the stability radii in the frequency range above 20 Hz (i.e., 20 Hz to 100 Hz), according to an implementation of the present disclosure. The horizontal axis represents time (in seconds (s)) and the vertical axis represents runtime frequency separated values of the dimensionless rate of change of stability radius for U, Y, and X. Specifically, curve 522 represents the dimensionless rate of change of the stability radius of the control action difference, $$\frac{\partial \ln(\rho\_U)}{\partial t};$$

curve 524 represents the dimensionless rate of change of the stability radius of the plant output difference, $$\frac{\partial \ln(\rho\_Y)}{\partial t};$$

and curve 526 represents the dimensionless rate of change of the stability radius of the plant state difference, $$\frac{\partial \ln(\rho\_X)}{\partial t}.$$

Referring back to FIG. 3, from 308, method 300 proceeds to 310.

At 310, a buffer is created for storing runtime traces of frequency separated values of stability radius measures. The stability radius measures can include one or more of the stability radius $\rho$ and its dimension rate $$\frac{\partial \ln(\rho\ )}{\partial t}$$

for X, Y, and U. A trace can include a time series of a variable. In some implementations, a trace can be plotted in a graph with respect to a time axis. For example, FIGS. 4A-4D and FIGS. 5A-5B show example runtime traces of frequency separated values of stability radius measures. In some implementations, the buffer can be implemented as a queue or another data structure. In some implementations, buffering parameters that control the sample time, buffer size, queuing method, and how to sample data, etc., can be received at 312, for example, at run time. As such, the sample data, sample time, buffer size, and queuing method can be adapted at run time accordingly. From 310, method 300 proceeds to 314, 316, and 318 for computing three examples of spectral relationships of interest, which include information or signatures of the three control attributes. The three examples of spectral relationships of interest can be the respective spectral relationships between two of the three vertices 215, 225, and 235 of the control triangle in FIG. 2.

At 314, observability signatures are computed based on a spectral relationship of the stability radius measure of the plant output (e.g., $\rho\_Y$, $$\left(e.g., \rho\_Y, \frac{\partial \ln(\rho\_Y)}{\partial t}\right)$$

versus the stability radius measure of the plant state (e.g., $\rho\_X$, $$\left(e.g., \rho\_X, \frac{\partial \ln(\rho\_X)}{\partial t}\right).$$

The spectral relationship can include a coherence computed, for example, according to the well-known mscohere( ) function. An observability signature can include one or more parameters or functions reflecting the observability. Example observability signatures can include the magnitude square coherence $C_{XY}(f)$ defined according to Equation (6), a variation thereof, or defined in another manner. In some implementations, the observability signatures can be computed based on each trace of the stability radius measures that contains signals within a respective predefined frequency range for the respective health and anomaly indicators (e.g., health $P(\mathcal{H})$ and anomaly $P(\forall)$ probabilities) of observability, for example, as described with respect to Table 1.

Figure 6A:
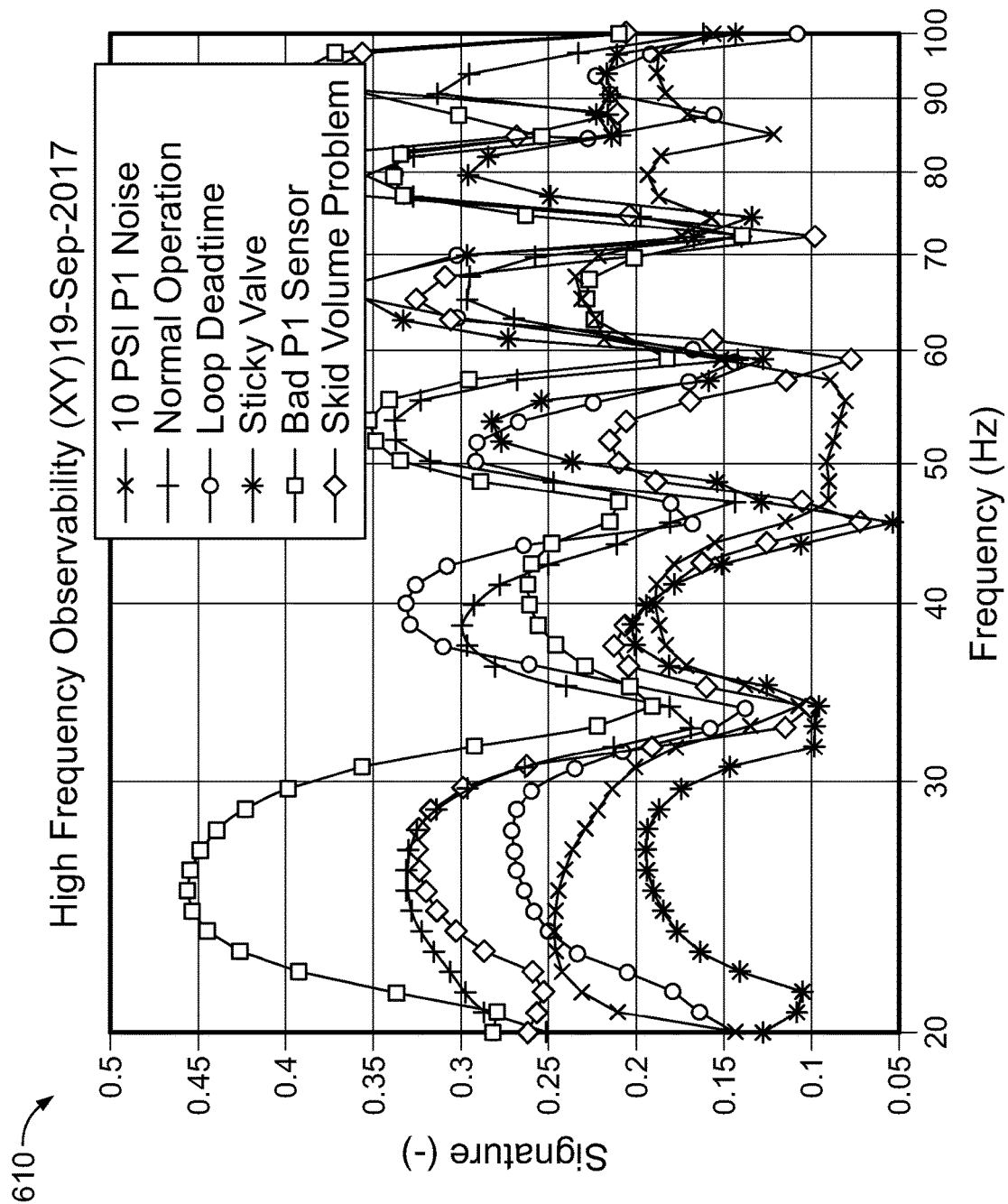
FIG. 6A is a data plot illustrating spectral correlations in a high frequency range (20~100 Hz) for computing the observability health signatures, according to an implementation of the present disclosure.
Figure 6B:
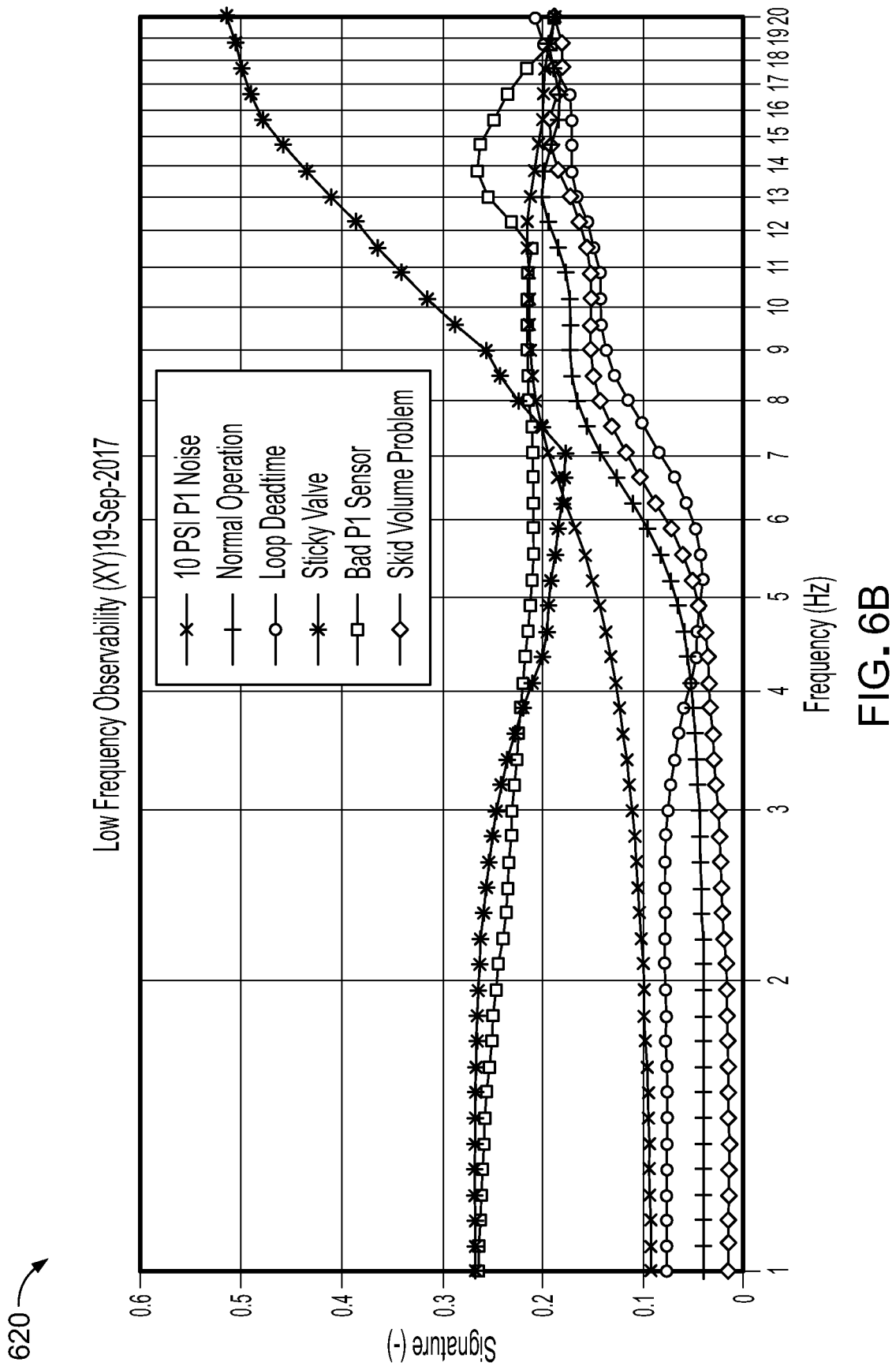
FIG. 6B is a data plot illustrating spectral correlations in a low frequency range (1~20 Hz) for computing the observability anomaly signatures, according to an implementation of the present disclosure.

FIG. 6A is a data plot 610 illustrating spectral correlations in a high frequency range (20~100 Hz) for computing the observability health signatures (i.e., signatures that contain health information of observability), according to an implementation of the present disclosure. The observability health signatures can be computed according to Table 1 for the above-mentioned six operational scenarios. FIG. 6B is a data plot 620 illustrating spectral correlations in a low frequency range (1~20 Hz) for computing the observability anomaly signatures (i.e., signatures that contain anomaly information of observability), according to an implementation of the present disclosure. The observability anomaly signatures can be computed according to Table 1 for the above-mentioned six operational scenarios. Referring back to FIG. 3, from 314, method 300 proceeds to 322.

At 322, independent observability anomaly and health indicators are determined based on the observability signatures. The observability anomaly indicator indicates a likelihood of an anomaly occurring in the plant control system with respect to observability. The observability health indicator indicates a likelihood of a normal operation of the plant control system with respect to the observability. The observability anomaly and health indicators can include health $P(\mathcal{H})$ and anomaly $P(\forall)$ probabilities for observability, respectively. The observability anomaly and health indicators can be computed based on separated frequency ranges, for example, according to the techniques described with respect to Table 1. For example, the observability anomaly indicator can be computed based on a first spectral correlation between the stability radius measure of the output difference and the stability radius measure of the state difference. The first spectral correlation are computed over a first frequency range. The observability health indicator can be computed based on a second spectral correlation between the stability radius measure of the output difference and the stability radius measure of the state difference. The second spectral correlation are computed over a second frequency range. The second frequency range is different from the first frequency range.

Figure 9A:
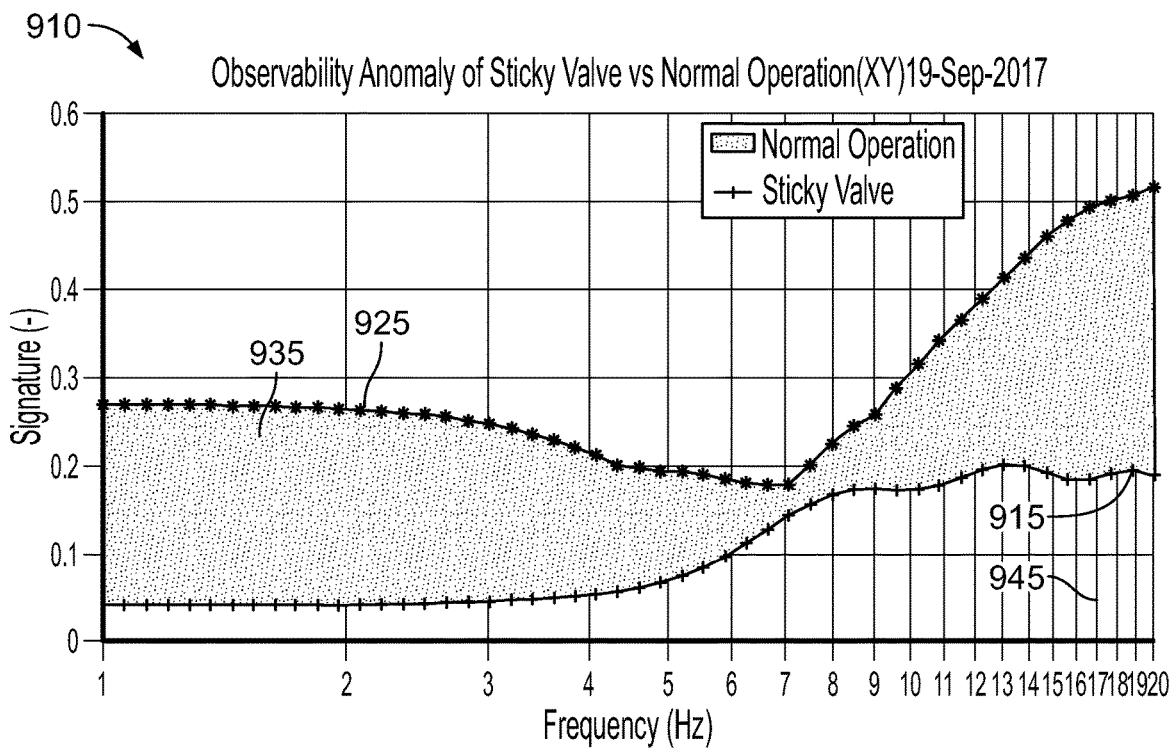
FIG. 9A is a data plot illustrating a visual representation of a calculation of an observability anomaly indicator under an operating condition of a sticky valve versus a normal operation, according to an implementation of the present disclosure.

FIG. 9A is a data plot 910 illustrating a visual representation of a calculation of an observability anomaly indicator (e.g., the observability anomaly probability $P(\forall)$) under an operating condition of a sticky valve versus a normal operation, according to an implementation of the present disclosure. In the data plot 910, the observability anomaly signatures under the operating condition of a sticky valve and the normal condition are represented by curves 915 and 925, respectively. The observability anomaly probability $P(\forall)$ under the operating condition of a sticky valve can be represented by a ratio of the size of the darkened area 935 between the two signature curves 915 and 925 relative to the area 945 under the normal operation signature curve 925.

Figure 9B:
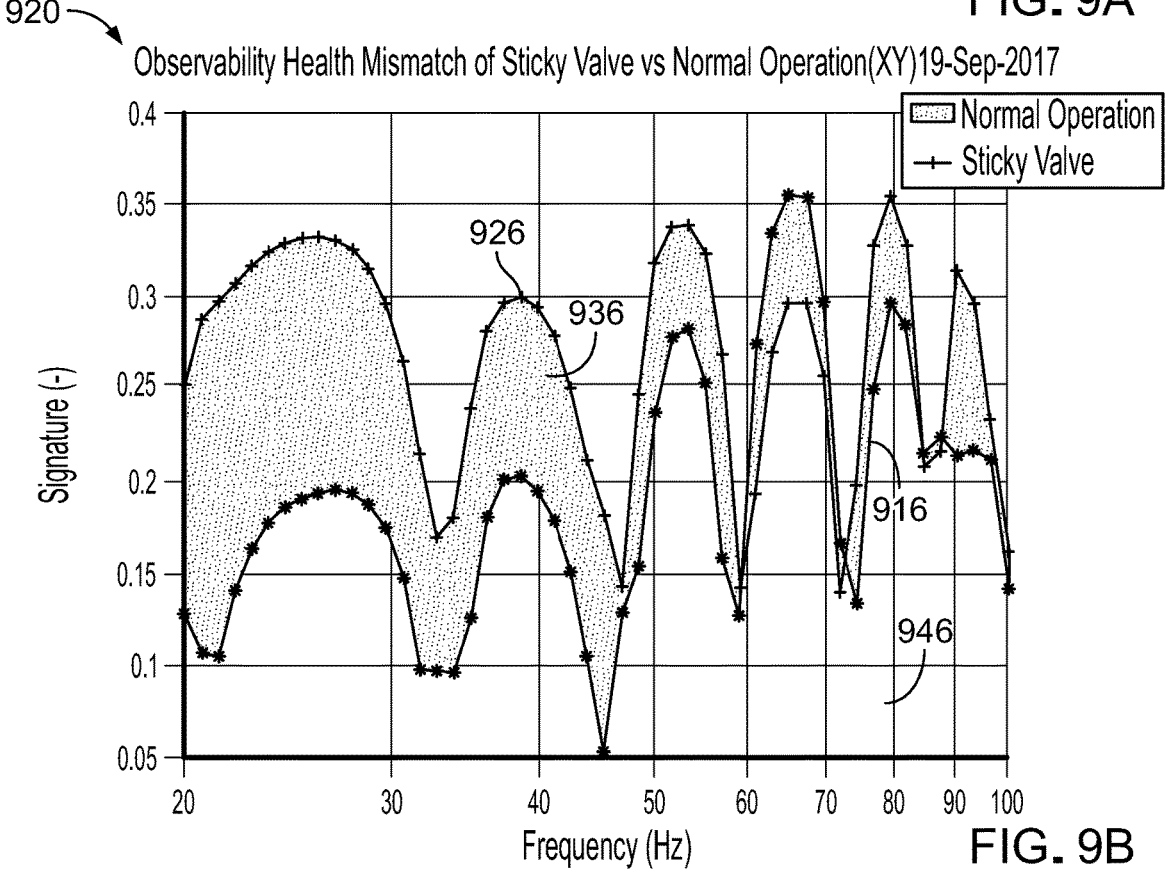
FIG. 9B is a data plot illustrating a visual representation of a calculation of an observability health indicator under an operating condition of a sticky valve versus a normal operation, according to an implementation of the present disclosure.

FIG. 9B is a data plot 920 illustrating a visual representation of a calculation of an observability health indicator (e.g., the observability health probability $P(\mathcal{H})$) under an operating condition of a sticky valve versus a normal operation, according to an implementation of the present disclosure. In the data plot 920, the observability health signatures under the operating condition of a sticky valve and the normal condition are represented by curves 916 and 926, respectively. An indicator of the lack of health for observability (e.g., 1−observability health probability $P(\mathcal{H})$) under the operating condition of a sticky valve can be represented by a ratio of the size of the darkened area 936 between the two signature curves 916 and 926 relative to the area 946 under the normal operation signature curve 926. Referring back to FIG. 3, from 322, method 300 proceeds to 330.

Similarly, at 316, tracking performance signatures are computed based on a spectral relationship of the stability radius measure of the plant output (e.g., $\rho\_Y$, $$\left(\text{e.g.}, \rho\_Y, \frac{\partial \ln(\rho\_Y)}{\partial t}\right)$$

versus the stability radius measure of the control action (e.g., $\rho\_U$, $$\left(\text{e.g.}, \rho\_U, \frac{\partial \ln(\rho\_U)}{\partial t}\right).$$

The spectral relationship can include a coherence computed, for example, according to the well-known mscohere( ) function. A tracking performance signature can include one or more parameters or functions reflecting the tracking performance. Example tracking performance signatures can include the magnitude square coherence $C_{UY}(f)$ defined according to Equation (6), a variation thereof, or defined in another manner. In some implementations, the tracking performance signatures can be computed based on each trace of the stability radius measures contains signals within a respective predefined frequency range for the respective health and anomaly indicators (e.g., health $P(\mathcal{H})$ and anomaly $P(\forall)$ probabilities) of tracking performance, for example, as described with respect to Table 1.

Figure 7A:
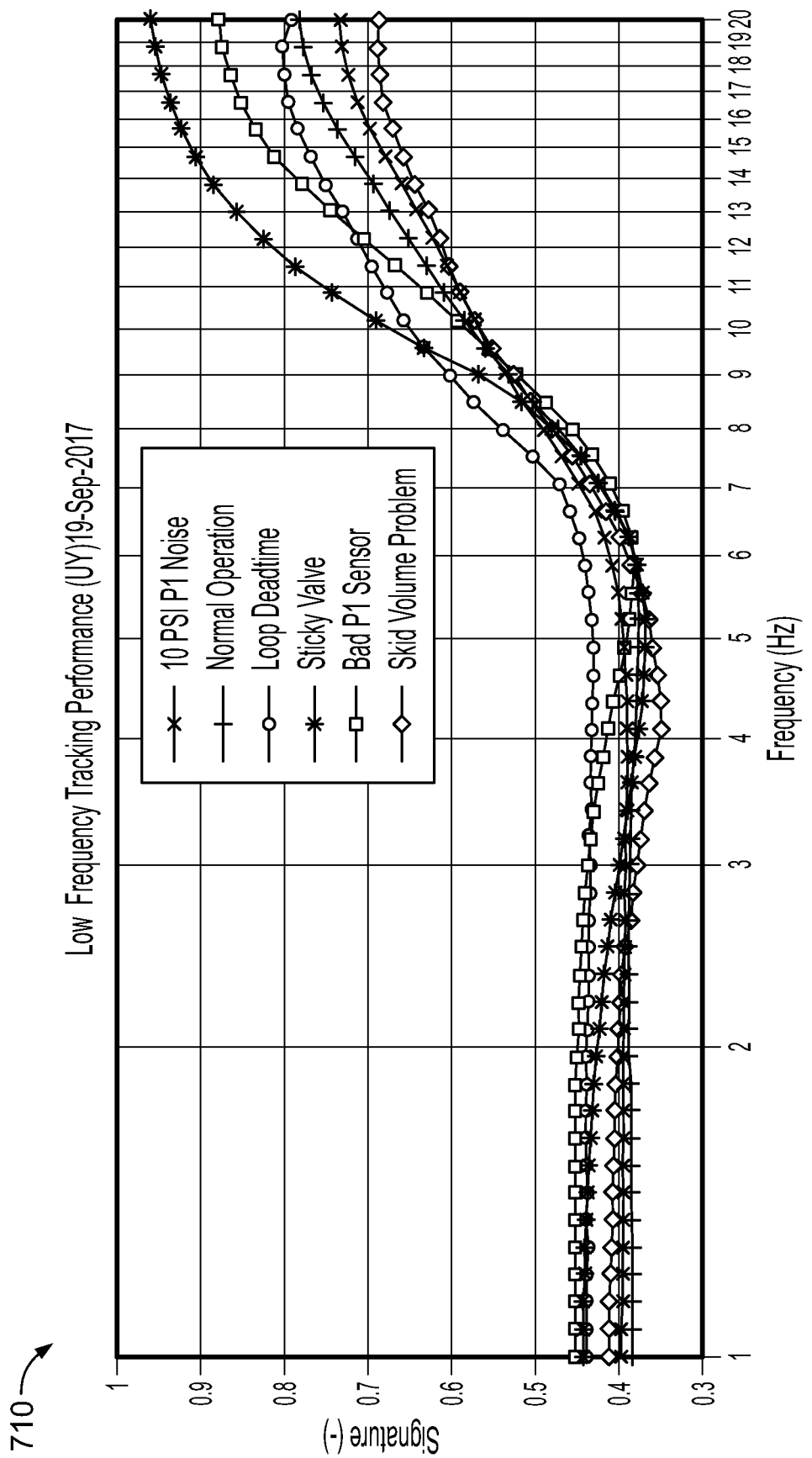
FIG. 7A is a data plot illustrating spectral correlations in a low frequency range (1~20 Hz) for computing the tracking performance health signature, according to an implementation of the present disclosure.

FIG. 7A is a data plot 710 illustrating spectral correlations in a low frequency range (1~20 Hz) for computing the tracking performance health signatures (i.e., signatures that contains health information of tracking performance), according to an implementation of the present disclosure. The tracking performance health signatures can be computed according to Table 1 for the above-mentioned six operational scenarios. FIG. 7B is a data plot 720 illustrating spectral correlations in a high frequency range (20~100 Hz) for computing the tracking performance anomaly signatures (i.e., signatures that contain anomaly information of tracking performance), according to an implementation of the present disclosure. The tracking performance anomaly signatures can be computed according to Table 1 for the above-mentioned six operational scenarios. Referring back to FIG. 3, from 316, method 300 proceeds to 324.

At 324, independent tracking performance anomaly and health indicators are determined based on the tracking performance signatures. The tracking performance anomaly indicator indicates a likelihood of an anomaly occurring in the plant control system with respect to tracking performance. The tracking performance health indicator indicates a likelihood of a normal operation of the plant control system with respect to the tracking performance. The tracking performance anomaly and health indicators can include health $P(\mathcal{H})$ and anomaly $P(\forall)$ probabilities for tracking performance, respectively. The tracking performance anomaly and health indicators can be computed based on separated frequency ranges, for example, according to the techniques described with respect to Table 1. For example, the tracking performance anomaly indicator can be computed based on a third spectral correlation between the stability radius measure of the output difference and the stability radius measure of the control action difference. The third spectral correlation can be imputed over a third frequency range. The tracking performance health indicator can be computed based on a fourth spectral correlation between the stability radius measure of the output difference and the stability radius measure of the control action difference. The fourth spectral correlation can be imputed over a fourth frequency range. The fourth frequency range is different from the third frequency range.

Figure 10A:
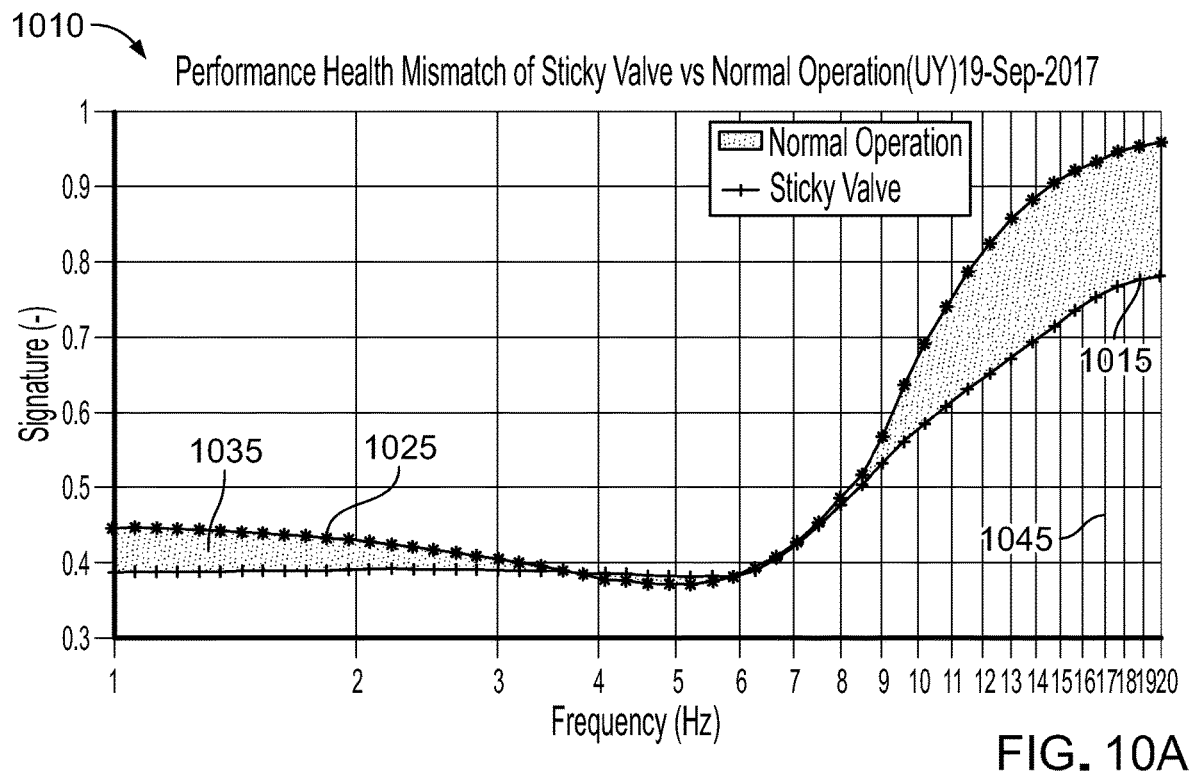
FIG. 10A is a data plot illustrating a visual representation of a calculation of a tracking performance health indicator under an operating condition of a sticky valve versus a normal operation, according to an implementation of the present disclosure.

FIG. 10A is a data plot 1010 illustrating a visual representation of calculation of an tracking performance health indicator (e.g., the tracking performance health probability $P(\mathcal{H})$) under an operating condition of a sticky valve versus a normal operation, according to an implementation of the present disclosure. In the data plot 1010, the tracking performance health signatures under the operating condition of a sticky valve and the normal condition are represented by curves 1015 and 1025, respectively. An indicator of the lack of health for tracking performance (e.g., 1−tracking performance health probability $P(\mathcal{H})$) under the operating condition of a sticky valve can be represented by a ratio of the size of the darkened area 1035 between the two signature curves 1015 and 1025 relative to the area 1045 under the normal operation signature curve 1025.

Figure 10B:
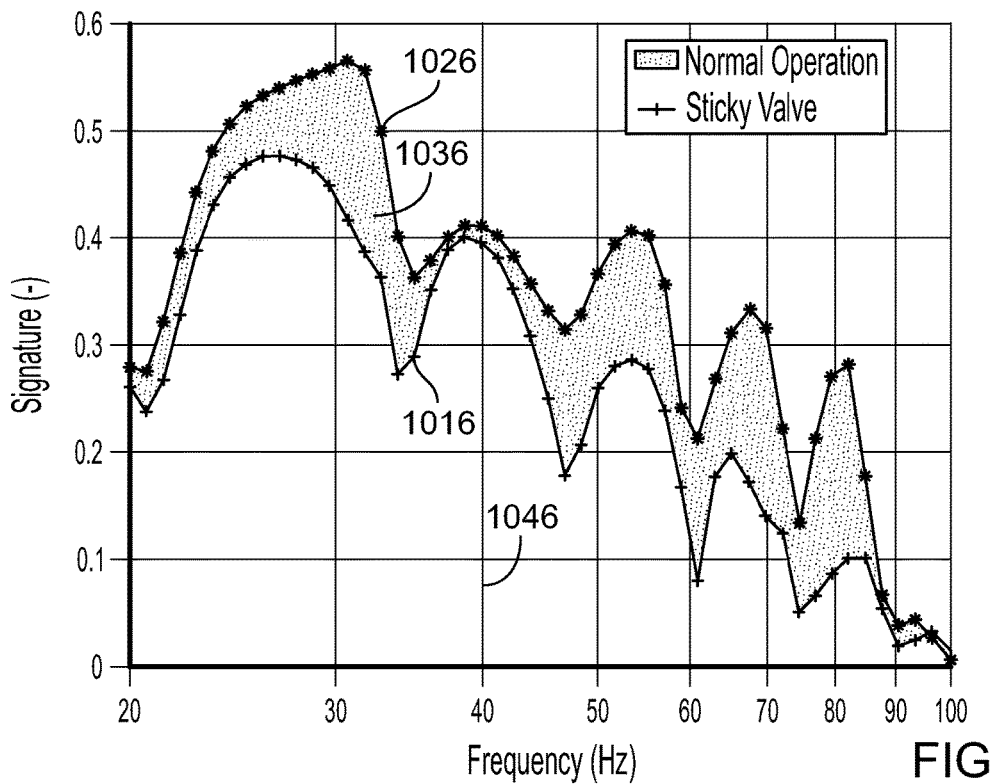
FIG. 10B is a data plot illustrating a visual representation of a calculation of a tracking performance anomaly indicator under an operating condition of a sticky valve versus a normal operation, according to an implementation of the present disclosure.

FIG. 10B is a data plot 1020 illustrating a visual representation of calculation of an tracking performance anomaly indicator (e.g., the tracking performance anomaly probability P(∀)) under an operating condition of a sticky valve versus a normal operation, according to an implementation of the present disclosure. In the data plot 1020, the tracking performance anomaly signatures under the operating condition of a sticky valve and the normal condition are represented by curves 1016 and 1026, respectively. The tracking performance anomaly probability P(∀) under the operating condition of a sticky valve can be represented by a ratio of the size of the darkened area 1036 between the two signature curves 1016 and 1026 relative to the area 1046 under the normal operation signature curve 1026. Referring back to FIG. 3, from 324, method 300 proceeds to 330.

Similarly, at 318, controllability signatures are computed based on a spectral relationship of the stability radius measure of the control action (e.g., ρ_U, δ ln ρ_U/δt) versus the stability radius measure of the plant state (e.g., ρ_X, δ ln ρ_X/δt). The spectral relationship can include a coherence computed, for example, according to the well-known mscohere( ) function. A controllability signature can include one or more parameters or functions reflecting the controllability. Example controllability signatures can include the magnitude square coherence $C_{UX}(f)$ defined according to Equation (6), a variation thereof, or defined in another manner. In some implementations, the controllability signatures can be computed based on each trace of the stability radius measures contains signals within a respective predefined frequency range for the respective health and anomaly indicators (e.g., health P($\mathcal{H}$) and anomaly P(∀) probabilities) of controllability, for example, as described with respect to Table 1.

Figure 8A:
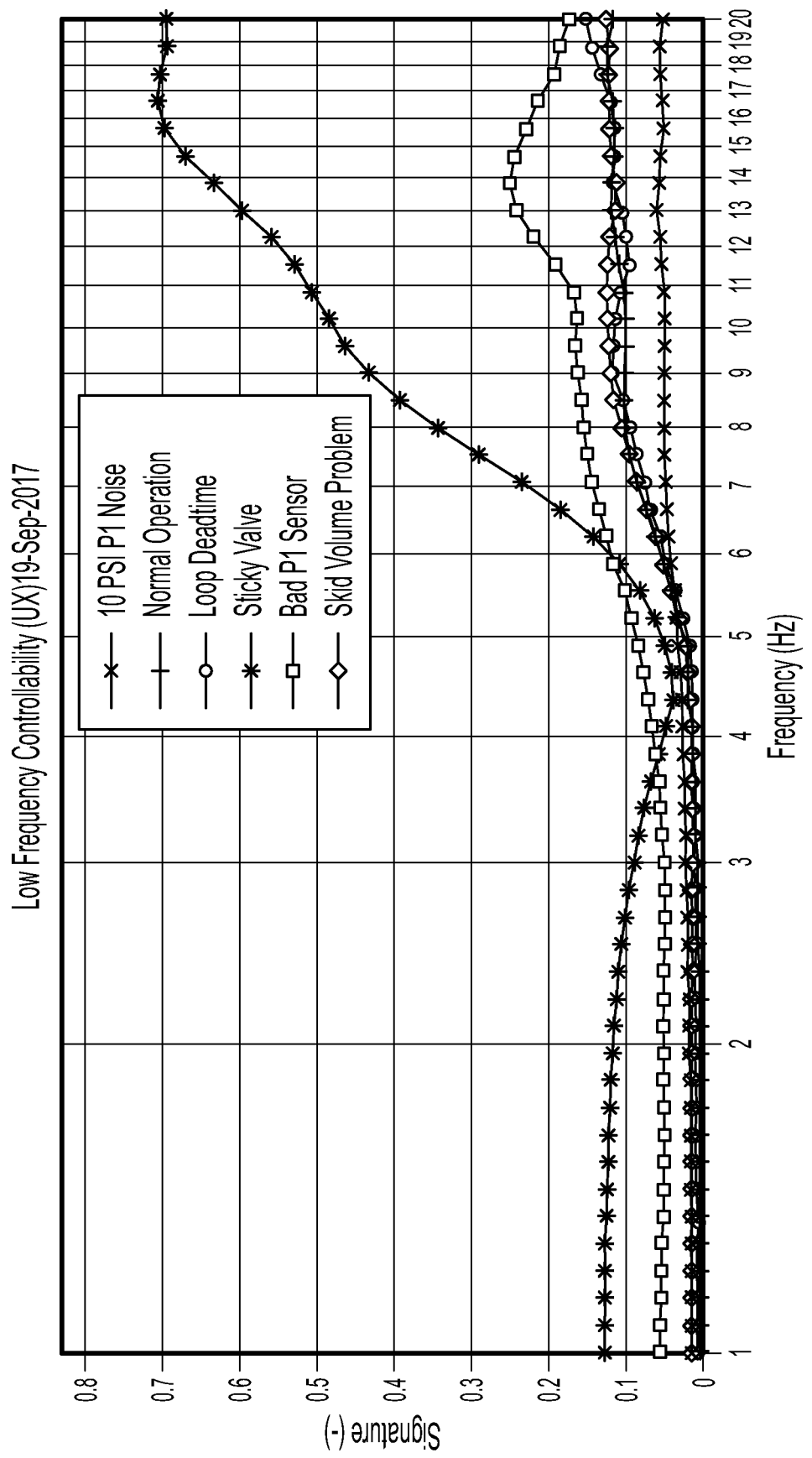
FIG. 8A is a data plot illustrating spectral correlations in a low frequency range (1~20 Hz) for computing the controllability health signature, according to an implementation of the present disclosure.

FIG. 8A is a data plot 810 illustrating spectral correlations in a low frequency range (1~20 Hz) for computing the controllability health signatures (i.e., signatures that contain health information of controllability), according to an implementation of the present disclosure. The controllability health signatures can be computed according to Table 1 for the above-mentioned six operational scenarios. FIG. 8B is a data plot 820 illustrating spectral correlations in a high frequency range (20~100 Hz) for computing the controllability anomaly signature (i.e., signature that contains anomaly information of controllability), according to an implementation of the present disclosure. The controllability anomaly signatures can be computed according to Table 1 for the above-mentioned six operational scenarios. Referring back to FIG. 3, from 318, method 300 proceeds to 326.

At 326, independent controllability anomaly and health indicators are determined based on the controllability signatures. The controllability anomaly indicator indicates a likelihood of an anomaly occurring in the plant control system with respect to controllability. The controllability health indicator indicates a likelihood of a normal operation of the plant control system with respect to the controllability. The controllability anomaly and health indicators can include health P($\mathcal{H}$) and anomaly P(∀) probabilities for controllability, respectively. The controllability anomaly and health indicators can be computed based on separated frequency ranges, for example, according to the techniques described with respect to Table 1. For example, the controllability anomaly indicator can be computed based on a fifth spectral relationship between the stability radius measure of the control action difference and the stability radius of the state difference. The fifth spectral correlation can be imputed over a fifth frequency range. The controllability health indicator can be computed based on a sixth spectral relationship between the stability radius measure of the control action difference and the stability radius of the state difference. The sixth spectral correlation can be imputed over a sixth frequency range. The fifth frequency range is different from the sixth frequency range.

Figure 11A:
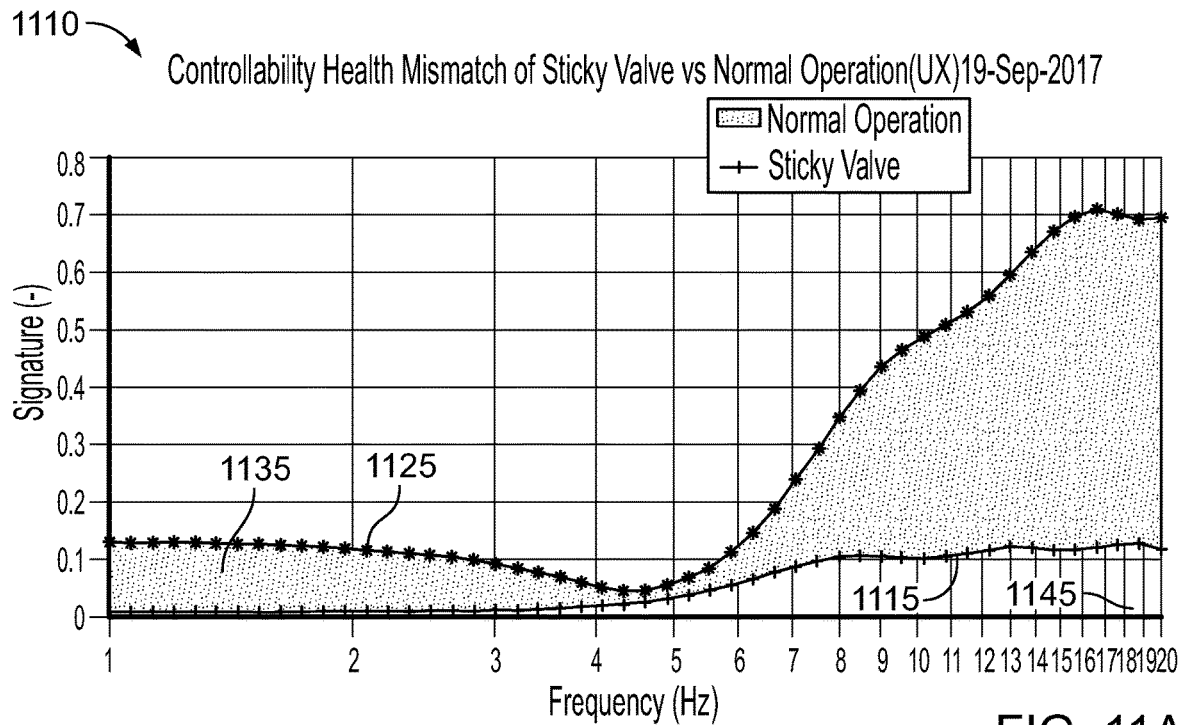
FIG. 11A is a data plot illustrating a visual representation of a calculation of a controllability health indicator under an operating condition of a sticky valve versus a normal operation, according to an implementation of the present disclosure.

FIG. 11A is a data plot 1110 illustrating a visual representation of a calculation of a controllability health indicator (e.g., the controllability health probability P($\mathcal{H}$)) under an operating condition of a sticky valve versus a normal operation. In the data plot 1110, the controllability health signatures under the operating condition of a sticky valve and the normal condition are represented by curves 1115 and 1125, respectively. An indicator of the lack of health (e.g., 1−controllability health probability P($\mathcal{H}$)) under the operating condition of a sticky valve can be represented by a ratio of the size of the darkened area 1135 between the two signature curves 1115 and 1125 relative to the area 1145 under the normal operation signature curve 1125.

Figure 11B:
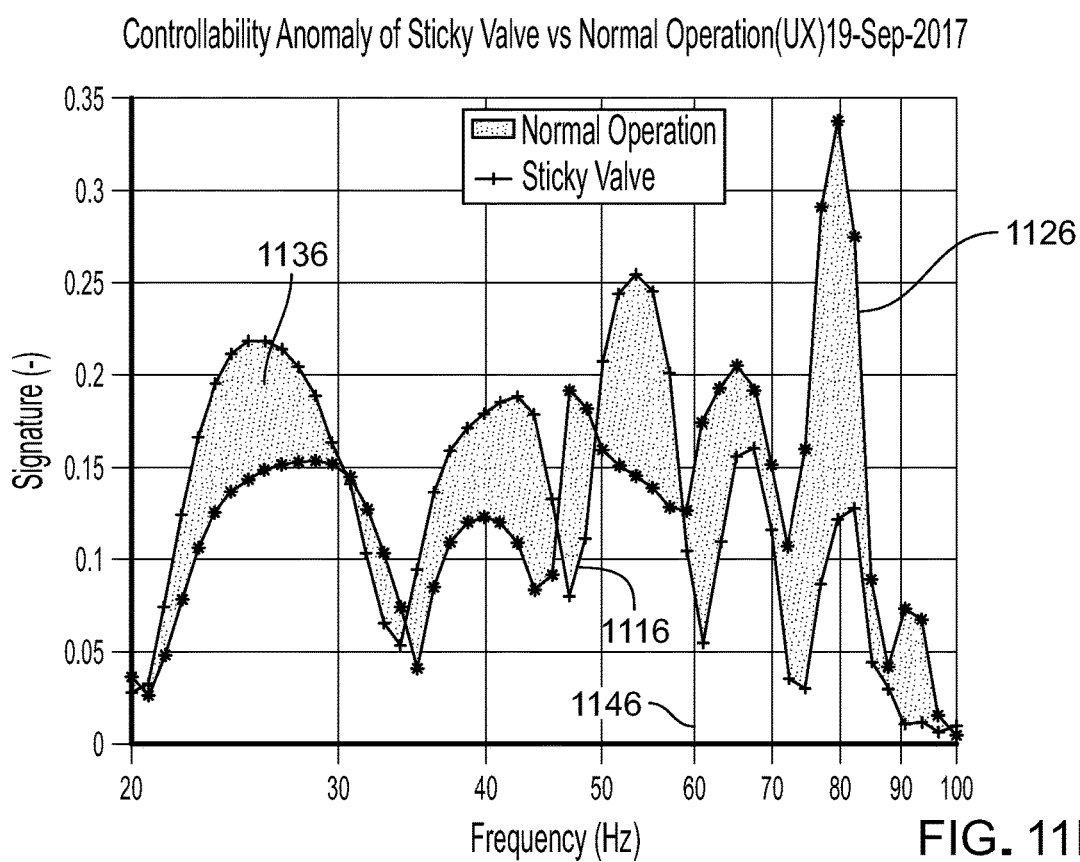
FIG. 11B is a data plot illustrating a visual representation of a calculation of a controllability anomaly indicator under an operating condition of a sticky valve versus a normal operation, according to an implementation of the present disclosure.

FIG. 11B is a data plot 1120 illustrating a visual representation of a calculation of a controllability anomaly indicator (e.g., the controllability anomaly probability P(∀)) under an operating condition of a sticky valve versus a normal operation. In the data plot 1120, the controllability anomaly signatures under the operating condition of a sticky valve and the normal condition are represented by curves 1116 and 1126, respectively. The controllability anomaly probability P(∀) under the operating condition of a sticky valve can be represented by a ratio of the size of the darkened area 1136 between the two signature curves 1116 and 1126 relative to the area 1146 under the normal operation signature curve 1126. Referring back to FIG. 3, from 326, method 300 proceeds to 330.

At 330, runtime anomaly and health probabilities for the one or more operating conditions or scenarios are computed. The runtime anomaly and health probabilities can include instantaneous health P($\mathcal{H}$) and anomaly P(∀) probabilities for observability, tracking performance, and controllability. The instantaneous health P($\mathcal{H}$) and anomaly P(∀) probabilities can be computed, for example, according to the techniques described with respect to Table 1.

Table 2 shows example runtime health and anomaly probabilities for each of the six example operating conditions as described above. As shown in Table 2, noisy P1 sensor does not impact tracking, but observability or ability to estimate the actual value of pressure at high frequency is low. Bad P1 sensor (e.g., one that is drifting uncontrollably and intermittently) also does not affect tracking much due to the close loop controller but the ability to control P1 or estimate it is severely compromised. A sticky valve also compromises the controllers ability to estimate the actual value of P1 pressure in addition to controlling it. However, the close loop controller is still compensating for it so tracking performance is acceptable. A skid volume change does adversely affect the metric a little, but it does not seriously impact the three main functions of the controller.

In these example operating conditions, the root cause for each scenario could be a cyber-attack, a physical failure, etc. The probabilities are updated each time the buffer of stability radii and their log derivatives are updated. As shown above, anomaly-based control does not need to know the root cause of the malfunctions, regardless if they are caused by a cyber-attack, incorrect operation of the system, human error, failure, or a physical accident. It is sufficient to have run time measures that reflect to what degree major attributes of the controller are healthy or anomalous. The controller can operate on live low signal to noise ratio data within the controller but still can quantify how healthy or anomalous the main functions of the controller are.

In some implementations, runtime anomaly and health probabilities for the one or more operating conditions can be stored or output. For example, the overall runtime anomaly and health probabilities for the one or more operating conditions can be displayed via a user interface in the form of a table, a graph, a plot, a chart, or another representation. In some implementations, color coding or other techniques can be used to help highlight the healthy and anomalous situations. From 330, method 300 proceeds to 340.

actuator(s) of the plant system to dynamically change the operation of the plant system to reduce the observability anomaly indicator, increase the observability health indicator, or both. Such instructions can be generated, for example, by directly adjusting or modifying one or more internal parameters of a state observer (e.g., values of the observer gains or observer poles). In some implementations, the instructions can cause the actuator of the plant system to dynamically change operation of the plant system to decrease the tracking performance anomaly indicator, increase the tracking performance health indicator, or both.

TABLE 2

Example runtime anomaly and health probabilities for multiple operating conditions

| Operating Condition | Tracking Performance Health | Tracking Performance Anomaly | Controllability Health | Controllability Anomaly | Observability Health | Observability Anomaly |
| --- | --- | --- | --- | --- | --- | --- |
| 10 PSI P1 Noise | 96% | 14% | 45% | 24% | 65% | 50% |
| Normal Operation | 100% | 0% | 100% | 0% | 100% | 0% |
| Loop Deadtime | 89% | 14% | 84% | 34% | 80% | 32% |
| Sticky Valve | 87% | 31% | 0% | 49% | 66% | 100% |
| Bad P1 Sensor | 90% | 17% | 0% | 42% | 79% | 100% |
| Skid Volume Problem | 95% | 27% | 87% | 39% | 79% | 21% |

At 340, one or more corrective actions are determined and applied to the plant control system based on the health and anomaly indicators. The one or more corrective actions can include one or more anomaly adaptation or avoidance mechanisms including, for example, switching control strategy, adapting controller gains, flagging to an anomaly monitoring system for corrective actions.

In some implementations, the plant system includes one or more actuators operable to change operations of the one or more pieces of equipment by actuating (e.g., opening, closing, or moving) one or more valves. Applying one or more corrective actions can include sending instructions to the one or more actuators to dynamically change operations of the one or more pieces of equipment based on at least one of the observability anomaly indicator, the observability health indicator, the tracking performance anomaly indicator, the tracking performance health indicator, the controllability anomaly indicator, or the controllability health indicator. For example, the plant system can comprise one or more valves; the one or more actuators can comprise valve actuators that actuate the one or more valves; and sending instructions to the one or more actuators to dynamically change operations of the one or more pieces of equipment comprises sending instructions to the valve actuator(s) of the plant system to dynamically change a position of the one or more valves of the plant system.

In some implementations, a target or desired operation range of one or more of the health and anomaly indicators can be determined. In some implementations, one or more control loops (e.g., a proportional-integral-derivative controller (PID controller)) can be used to modify the gains inside the controller in order to control or keep the health and anomaly indicators on target. As such, instructions can be generated and sent to the one or more actuators to dynamically change operations of the one or more pieces of equipment to control or keep the health and anomaly indicators on target. For example, the instructions can cause the Such instructions can be generated, for example, by directly adjusting or modifying one or more internal parameters of a reference model (e.g., values of the reference model gains or reference model poles). In some implementations, the instructions can cause the actuator(s) of the plant system to dynamically change operation of the plant system to decrease the controllability anomaly indicator, increase the controllability health indicator, or both. Such instructions can be generated, for example, by directly adjusting or modifying one or more internal parameters of a state feedback (e.g., values of the state feedback gains or state feedback poles). Additional or different instructions can be generated and sent to the one or more actuators to dynamically change operations of the one or more pieces of equipment to control or keep the health and anomaly indicators on target. In some implementations, the one or more corrective actions can help the plant control system achieve anomaly-based adaptive control at run time, for example, as described in more details with respect to FIG. 15 below. After 340, method 300 stops.

Figure 13:
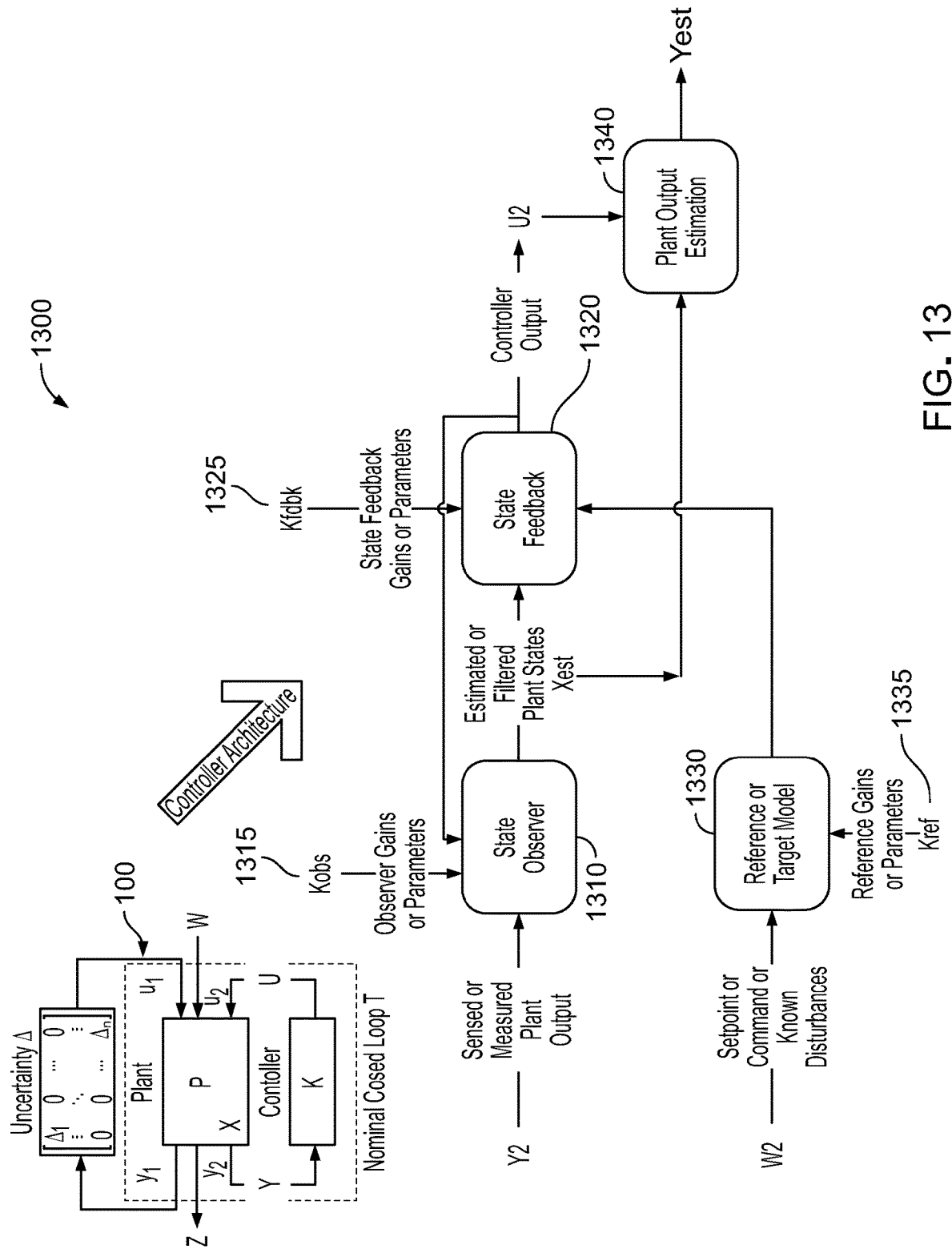
FIG. 13 is a block diagram illustrating an example model-based control architecture represented by the example plant control system 100 in FIG. 1, according to an implementation of the present disclosure.

FIG. 13 is a block diagram illustrating an example model-based control architecture of a controller K 1300 represented by the example plant control system 100 in FIG. 1, according to an implementation of the present disclosure. The model-based control architecture of the controller K 1300 can include a state observer 1310, a state feedback 1320, a reference or target model 1330 and a plant output estimation module 1340.

The state observer 1310 can receive observer gains or parameters of the controller $K_{obs}$ 1315, sensed or measured plant output $Y_2$ and $U_2$. Based on the received inputs, the state observer 1310 can output estimated or filtered plant states Xest. The state observer 1310 can be implemented as a software or a hardware module for estimating the plant states.

The reference or target model 1330 can receive setpoint or commands or known disturbances $W_2$ and reference gains or parameters $K_{ref}$ 1335. Based on the received inputs, the reference or target model 1330 can output a reference (or a target, goal or ideal) value of the plant states Xref, for example, based on statistical or pre-determined functions or models.

The state feedback 1320 can receive the estimated or filtered plant states Xest, the reference value of the plant states Xref, and state feedback gains or parameters $K_{fdbk}$ 1325. Based on the received inputs, the state feedback 1320 can output a control output $U_2$, which can serve as a control action or input to be applied to a plant system.

In some implementations, the control output $U_2$ and the estimated or filtered plant states Xest can be processed by the plant output estimation module 1340 to compute an estimated plant output Yest, for example, based on statistical or pre-determined transfer functions or models. In some implementations, the estimated plant output Yest can serve as the reference plant state Yref for computing runtime difference of the plant state Y.

In some implementations, to obtain finer anomaly and health information, the model-based control architecture 1200 can be recursively partitioned into smaller subsystems and components. The partitioning can be virtual or it can match the actual architecture of the plant (i.e., an actual decomposition of the plant system into subsystems and components). For example, a plant control system can be intentionally architected by an interconnection of components in series or in parallel, where each component may be represented by the plant control system 100 in FIG. 1. In this case, each component of the plant control system can be regarded as an individual control node that internally computes its health and anomaly according to the techniques described above. Such a structure thus fits well with a distributed control architecture.

Figure 14:
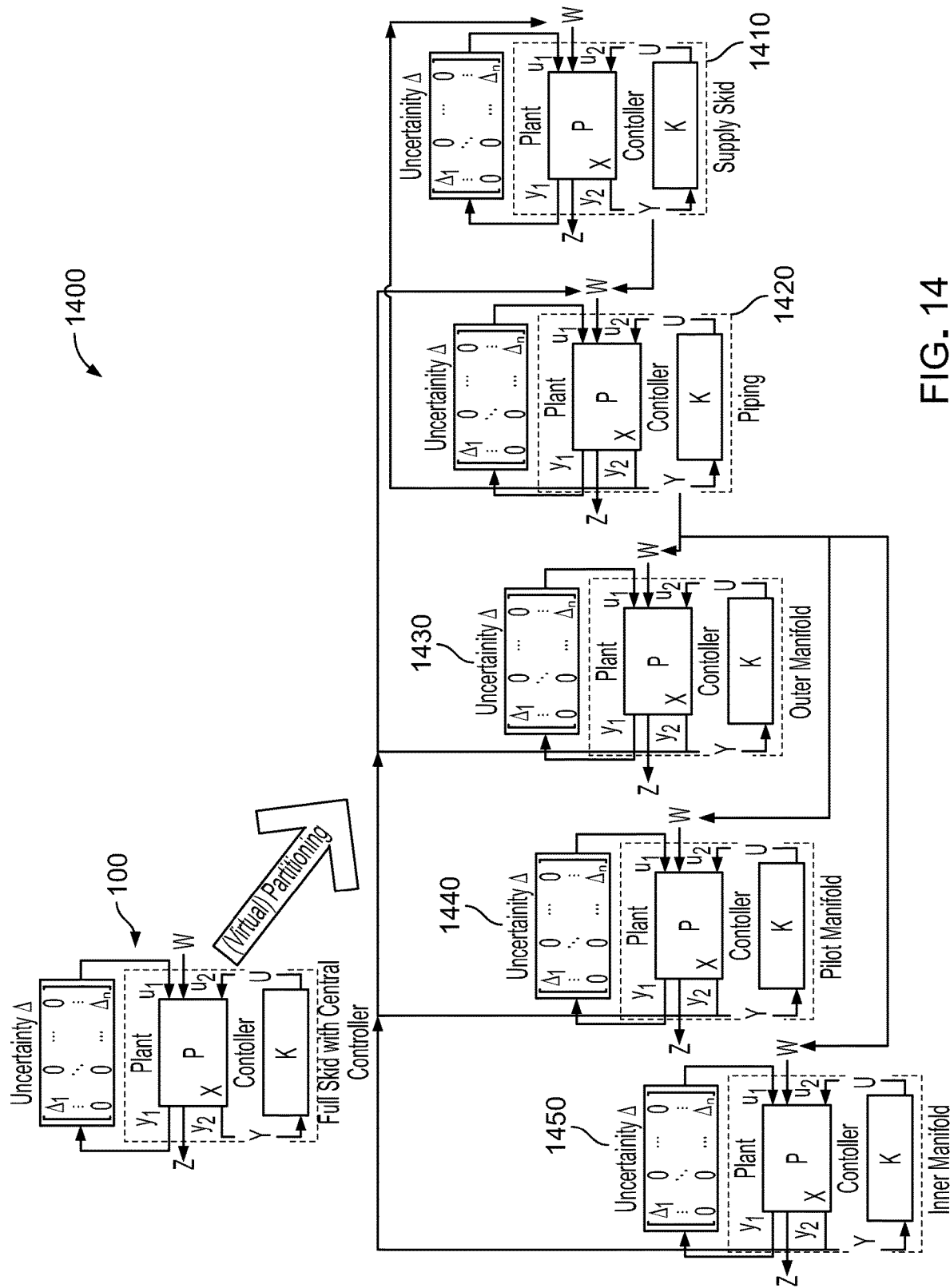
FIG. 14 is a block diagram illustrating an example distributed architecture of the example liquid fuel skid system 1200 in FIG. 12, according to an implementation of the present disclosure.

FIG. 14 is a block diagram illustrating an example distributed architecture 1400 of the example liquid fuel skid system 1200 in FIG. 12, according to an implementation of the present disclosure. The example liquid fuel skid system 1200 in FIG. 12 is partitioned into five subsystems or components: the supply skid 1210, piping subsystem 1220, outer manifold 1230, pilot manifold 1240, and inner manifold 1250. Each of the subsystems of the example liquid fuel skid system 1200 can be represented by a respective plant control system similar to the plant control system 100 in FIG. 1. Each of the subsystems can individually perform anomaly detection and anomaly-based control according to the techniques described above. For example, the distributed architecture 1400 of the example liquid fuel skid system 1200 includes example plant control systems 1410, 1420, 1430, 1440, and 1450 corresponding to the supply skid 1210, piping subsystem 1220, outer manifold 1230, pilot manifold 1240, and inner manifold 1250 of the example liquid fuel skid system 1200 in FIG. 12, respectively.

In some implementations, partitioning an overall plant into a distributed architecture can obtain finer health and anomaly information that enable component-level identification or detection of anomaly. In some implementations, each partition has its own separate controller such that distributed control is realized. As such, advantages such as minimizing wiring, improved performance, modular development and upgrades, etc. can be achieved. In some implementations, each distributed controller can be set up to adapt to health and anomaly changes at run time to reduce the impact of anomalies without having to know exactly what the anomaly is. In some implementations, it also allows adding functionality to smart subsystems and components away from central controllers or central or supervisory control algorithms. Hence additional or different advantages can be achieved.

Figure 15:
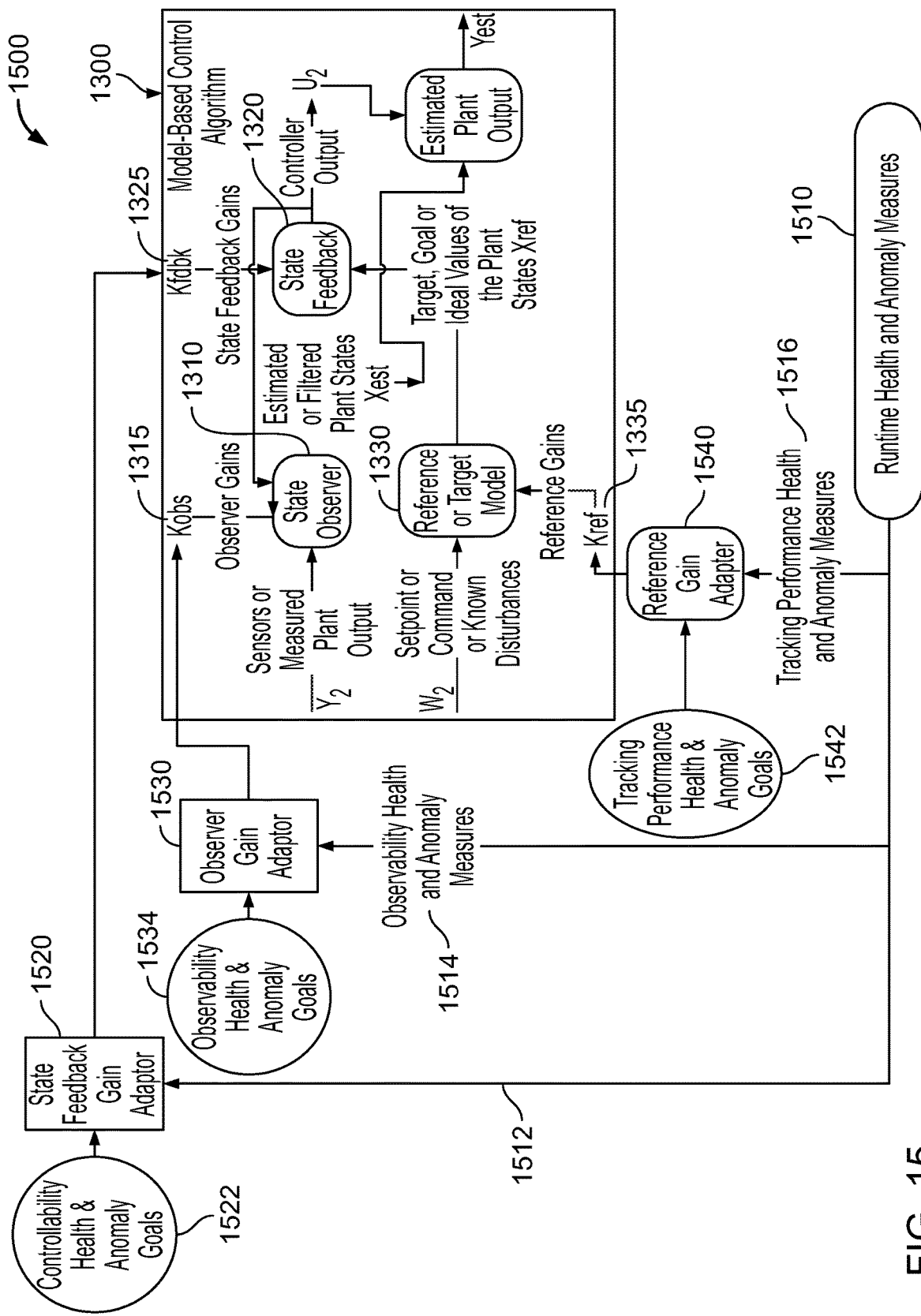
FIG. 15 is a block diagram illustrating an example architecture of implementing anomaly-based adaptive control, according to an implementation of the present disclosure.

FIG. 15 is a block diagram illustrating an example architecture 1500 of implementing anomaly-based adaptive control, according to an implementation of the present disclosure. One advantage of having runtime measures of controllability, observability, and tracking performance is that there is a live feedback to adjust or adapt each of the three main components of an advanced model-based control architecture of a controller, for example, the state observer 1310, the state feedback 1320, and the reference model 1330 of the controller 1300 as shown in FIG. 13. In some implementations, one or more of state feedback gain adaptor 1520, observer gain adaptor 1530, or reference gain adaptor 1540 can be implemented using a PID controller to modify the gains inside the controller 1300 in order to control or keep the health and anomaly indicators on target.

As shown in FIG. 15, runtime health and anomaly measures or indicators 1510 can include runtime health and anomaly measures for controllability, observability, and tracking performance, respectively. The runtime health and anomaly measures 1510 can include the health and anomaly probabilities, for example, obtained according to the example method 300.

The state feedback gain adaptor 1520 can receive the runtime health and anomaly measures for controllability 1512 as well as controllability health and anomaly goals 1522 (e.g., a target value or a tolerance range). Based on these two inputs, the state feedback gain adaptor 1520 can determine one or more adjustments to gains and parameters of the state feedback 1320 and feed them back as $K_{fdbk}$ 1325 to the state feedback 1320.

The observer gain adaptor 1530 can receive the runtime health and anomaly measures for observability 1514 as well as observability health and anomaly goals 1534 (e.g., a target or tolerance range). Based on these two inputs, the observer gain adaptor 1530 can determine one or more adjustments to gains and parameters of the state observer 1310 and feed them back as $K_{obs}$ 1315 to the state observer 1310.

The reference gain adaptor 1540 can receive the runtime health and anomaly measures for tracking performance 1516 as well as tracking performance health and anomaly goals 1542 (e.g., a target or tolerance range). Based on these two inputs, the reference gain adaptor 1540 can determine one or more adjustments to gains and parameters of the reference or target model 1330 and feed them back as $K_{ref}$ 1335 to the reference or target model 1330.

Figure 16:
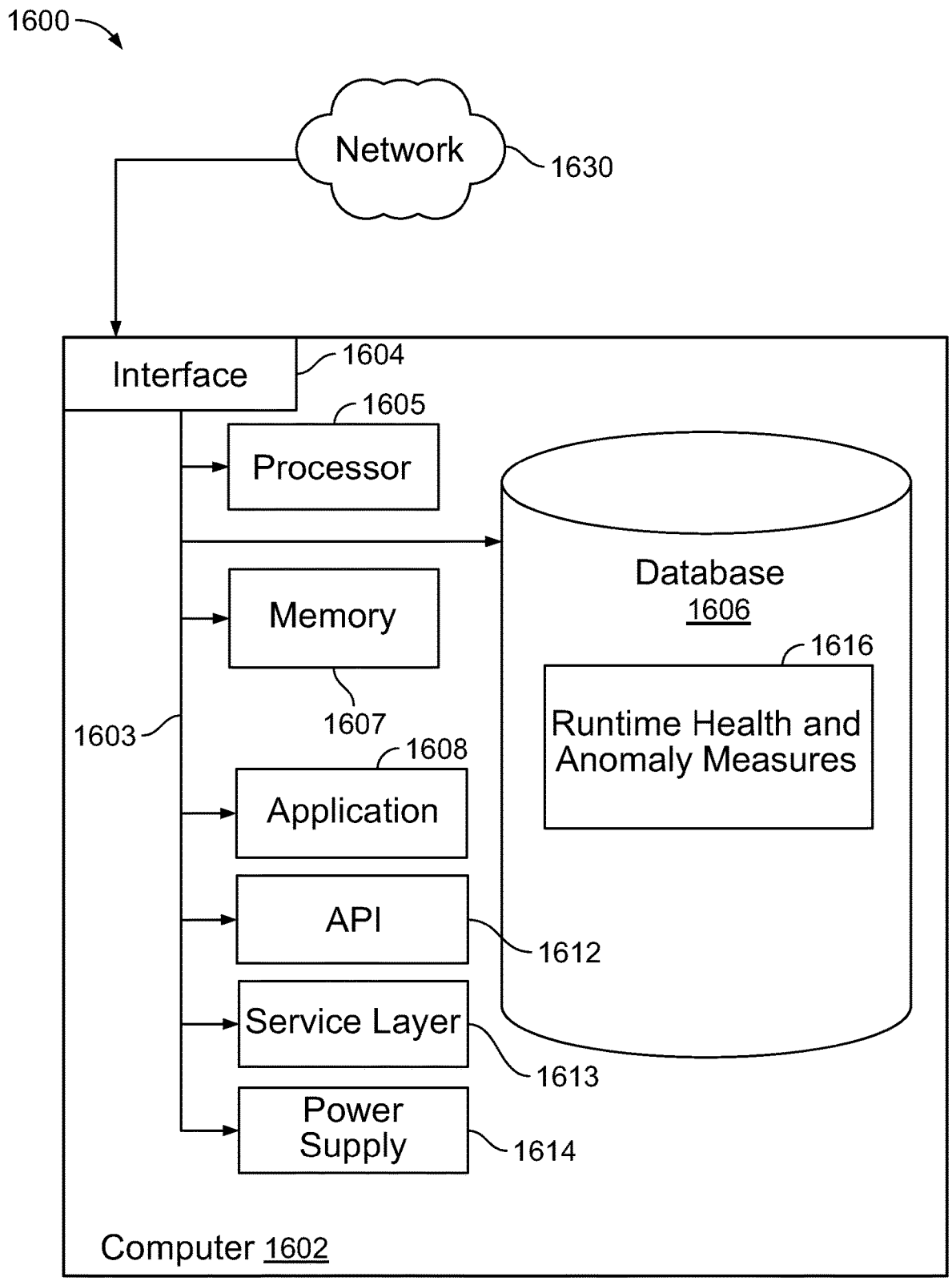
FIG. 16 is a block diagram illustrating an example of a computer-implemented system used to provide computational functionalities associated with described algorithms, methods, functions, processes, flows, and procedures, according to an implementation of the present disclosure.

FIG. 16 is a block diagram illustrating an example of a computer-implemented system 1600 used to provide computational functionalities associated with described algorithms, methods, functions, processes, flows, and procedures, according to an implementation of the present disclosure. In the illustrated implementation, system 1600 includes a computer 1602 and a network 1630.

The illustrated computer 1602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the computer 1602 can include an input device, such as a keypad, keyboard, touch screen, another input device, or a combination of input devices that can accept user information, and an output device that conveys information associated with the operation of the computer 1602, including digital data, visual, audio, another type of information, or a combination of types of information, on a graphical-type user interface (UI) (or GUI) or other UI. For example, in some implementations, the illustrated data (such as, in FIGS. 4A-4D, 5A-5B, 6A-6B, 7A-7B, 8A-8B, 9A-9B, 10A-10B, and 11A-11B) presented in a GUI or other GUIs (whether illustrated or not) can be interactive in nature and be configured to permit user actions to be performed (such as, triggering messages or requests for data to change, modify, or enhance the illustrated data or to perform actions based on the illustrated data).

The computer 1602 can serve in a role in a distributed computing system as a client, network component, a server, a database or another persistency, another role, or a combination of roles for performing the subject matter described in the present disclosure. The illustrated computer 1602 is communicably coupled with a network 1630. In some implementations, one or more components of the computer 1602 can be configured to operate within an environment, including cloud-computing-based, local, global, another environment, or a combination of environments.

At a high level, the computer 1602 is an electronic computing device operable to receive, transmit, process, store, or manage data and information associated with the described subject matter. According to some implementations, the computer 1602 can also include or be communicably coupled with a server, including an application server, e-mail server, web server, caching server, streaming data server, another server, or a combination of servers.

The computer 1602 can receive requests over network 1630 (for example, from a client software application executing on another computer 1602) and respond to the received requests by processing the received requests using a software application or a combination of software applications. In addition, requests can also be sent to the computer 1602 from internal users (for example, from a command console or by another internal access method), external or third-parties, or other entities, individuals, systems, or computers.

Each of the components of the computer 1602 can communicate using a system bus 1603. In some implementations, any or all of the components of the computer 1602, including hardware, software, or a combination of hardware and software, can interface over the system bus 1603 using an application programming interface (API) 1612, a service layer 1613, or a combination of the API 1612 and service layer 1613. The API 1612 can include specifications for routines, data structures, and object classes. The API 1612 can be either computer-language independent or dependent and refer to a complete interface, a single function, or even a set of APIs. The service layer 1613 provides software services to the computer 1602 or other components (whether illustrated or not) that are communicably coupled to the computer 1602. The functionality of the computer 1602 can be accessible for all service consumers using this service layer. Software services, such as those provided by the service layer 1613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 1602, alternative implementations can illustrate the API 1612 or the service layer 1613 as stand-alone components in relation to other components of the computer 1602 or other components (whether illustrated or not) that are communicably coupled to the computer 1602. Moreover, any or all parts of the API 1612 or the service layer 1613 can be implemented as a child or a sub-module of another software module, enterprise application, or hardware module without departing from the scope of the present disclosure.

The computer 1602 includes an interface 1604. Although illustrated as a single interface 1604 in FIG. 16, two or more interfaces 1604 can be used according to particular needs, desires, or particular implementations of the computer 1602. The interface 1604 is used by the computer 1602 for communicating with another computing system (whether illustrated or not) that is communicatively linked to the network 1630 in a distributed environment. Generally, the interface 1604 is operable to communicate with the network 1630 and includes logic encoded in software, hardware, or a combination of software and hardware. More specifically, the interface 1604 can include software supporting one or more communication protocols associated with communications such that the network 1630 or interface's hardware is operable to communicate physical signals within and outside of the illustrated computer 1602.

The computer 1602 includes a processor 1605. Although illustrated as a single processor 1605 in FIG. 16, two or more processors can be used according to particular needs, desires, or particular implementations of the computer 1602. Generally, the processor 1605 executes instructions and manipulates data to perform the operations of the computer 1602 and any algorithms, methods, functions, processes, flows, and procedures as described in the present disclosure.

The computer 1602 also includes a database 1606 that can hold data for the computer 1602, another component communicatively linked to the network 1630 (whether illustrated or not), or a combination of the computer 1602 and another component. For example, database 1606 can be an in-memory, conventional, or another type of database storing data consistent with the present disclosure. In some implementations, database 1606 can be a combination of two or more different database types (for example, a hybrid in-memory and conventional database) according to particular needs, desires, or particular implementations of the computer 1602 and the described functionality. Although illustrated as a single database 1606 in FIG. 16, two or more databases of similar or differing types can be used according to particular needs, desires, or particular implementations of the computer 1602 and the described functionality. While database 1606 is illustrated as an integral component of the computer 1602, in alternative implementations, database 1606 can be external to the computer 1602. As illustrated, the database 1606 holds the previously described runtime health and anomaly measures 1616.

The computer 1602 also includes a memory 1607 that can hold data for the computer 1602, another component or components communicatively linked to the network 1630 (whether illustrated or not), or a combination of the computer 1602 and another component. Memory 1607 can store any data consistent with the present disclosure. In some implementations, memory 1607 can be a combination of two or more different types of memory (for example, a combination of semiconductor and magnetic storage) according to particular needs, desires, or particular implementations of the computer 1602 and the described functionality. Although illustrated as a single memory 1607 in FIG. 16, two or more memories 1607 or similar or differing types can be used according to particular needs, desires, or particular implementations of the computer 1602 and the described functionality. While memory 1607 is illustrated as an integral component of the computer 1602, in alternative implementations, memory 1607 can be external to the computer 1602.

The application 1608 is an algorithmic software engine providing functionality according to particular needs, desires, or particular implementations of the computer 1602, particularly with respect to functionality described in the present disclosure. For example, application 1608 can serve as one or more components, modules, or applications. Further, although illustrated as a single application 1608, the application 1608 can be implemented as multiple applications 1608 on the computer 1602. In addition, although illustrated as integral to the computer 1602, in alternative implementations, the application 1608 can be external to the computer 1602.

The computer 1602 can also include a power supply 1614. The power supply 1614 can include a rechargeable or non-rechargeable battery that can be configured to be either user- or non-user-replaceable. In some implementations, the power supply 1614 can include power-conversion or management circuits (including recharging, standby, or another power management functionality). In some implementations, the power-supply 1614 can include a power plug to allow the computer 1602 to be plugged into a wall socket or another power source to, for example, power the computer 1602 or recharge a rechargeable battery.

There can be any number of computers 1602 associated with, or external to, a computer system containing computer 1602, each computer 1602 communicating over network 1630. Further, the term "client," "user," or other appropriate terminology can be used interchangeably, as appropriate, without departing from the scope of the present disclosure. Moreover, the present disclosure contemplates that many users can use one computer 1602, or that one user can use multiple computers 1602.

In some implementations, the described methodology can be configured to send messages, instructions, or other communications to a computer-implemented controller, database, or other computer-implemented system to dynamically initiate control of, control, or cause another computer-implemented system to perform a computer-implemented or other function/operation. For example, operations based on data, operations, outputs, or interaction with a GUI can be transmitted to cause operations associated with a computer, database, network, or other computer-based system to perform dynamic or adaptive control, storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of mechanical, electronic, computing or other type of equipment. For example, the described controller can send an instruction to open, close, or otherwise modify a position of a valve, an instruction to start or throttle motor, a request to slow or speed up a computer database, magnetic/optical disk drive, activate/deactivate a computing system, cause a network interface device to become enabled/disabled or throttled, to increase data bandwidth allowed across a network connection, or to sound an audible/visual alarm (such as, a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to control of an automobile, a ship, an aircraft, a turbine system, or a smart actuation system or for other purposes consistent with this disclosure. In some implementations, the described methodology can be integrated as part of a dynamic computer-implemented control system to control, influence, or use with any tangible, real-world equipment explicitly mentioned in, or consistent with, this disclosure.

Described implementations of the subject matter can include one or more features, alone or in combination.

For example, in a first implementation, a plant control system comprises a plant system comprising one or more pieces of equipment; and a control system controlling the plant system. The control system comprises one or more computers and one or more computer memory devices interoperably coupled with the one or more computers and having tangible, non-transitory, machine-readable media storing one or more instructions that, when executed by the one or more computers, perform one or more following operations.

Runtime conditions of an operating point of the plant control system are received. The runtime conditions of the operating point comprise a runtime state of the plant system, a runtime output of the plant system, and a runtime control action applied to the plant system. Reference conditions of a reference point corresponding to the operating point are determined. The reference conditions of the reference point comprise a reference state of the plant system, a reference output of the plant system, and a reference control action applied to the plant system. Differences between the reference point and the operating point are computed based on the reference conditions and the runtime conditions. The differences comprises: a state difference between the runtime state and the reference state of the plant system, an output difference between the runtime output and the reference output of the plant system, and a control action difference between the runtime control action and the reference control action applied to the plant system. A stability radius measure of the state difference, a stability radius measure of the output difference, and a stability radius measure of the control action difference are computed.

An observability anomaly indicator is determined based on a first spectral correlation between the stability radius measure of the output difference and the stability radius measure of the state difference. The first spectral correlation is computed over a first frequency range. The observability anomaly indicator indicates a likelihood of an anomaly occurring in the plant control system with respect to observability. The observability indicates an ability of the control system to estimate a state of the plant system based on a measured output of the plant system.

An observability health indicator is determined based on a second spectral correlation between the stability radius measure of the output difference and the stability radius measure of the state difference. The second spectral correlation is computed over a second frequency range. The observability health indicator indicates a likelihood of a normal operation of the plant control system with respect to the observability. The second frequency range is different from the first frequency range.

A tracking performance anomaly indicator is determined based on a third spectral correlation between the stability radius measure of the output difference and the stability radius measure of the control action difference. The third spectral correlation is computed over a third frequency range. The tracking performance anomaly indicator indicates a likelihood of an anomaly occurring in the plant control system with respect to tracking performance. The tracking performance measures an ability of the control system to track a set point.

A tracking performance health indicator is determined based on a fourth spectral correlation between the stability radius measure of the output difference and the stability radius measure of the control action difference. The fourth spectral correlation is computed over a fourth frequency range. The tracking performance health indicator indicates a likelihood of a normal operation of the plant control system with respect to the tracking performance. The fourth frequency range is different from the third frequency range.

A controllability anomaly indicator is determined based on a fifth spectral relationship between the stability radius measure of the control action difference and the stability radius of the state difference. The fifth spectral correlation is computed over within a fifth frequency range, wherein the controllability anomaly indicator indicates a likelihood of an anomaly occurring in the plant control system with respect to controllability. The controllability indicates an ability of the control system to impact a state of the plant system.

A controllability health indicator is determined based on a sixth spectral relationship between the stability radius measure of the control action difference and the stability radius of the state difference. The sixth spectral correlation is computed over a sixth frequency range. The controllability health indicator indicates a likelihood of a normal operation of the plant control system with respect to the controllability. The fifth frequency range is different from the sixth frequency range.

The foregoing and other described implementations can each, optionally, include one or more of the following features:

A first feature, combinable with any of the following features, wherein the plant system further comprises one or more actuators operable to change operations of the one or more pieces of equipment, and the operations further comprising sending instructions to the one or more actuators to dynamically change operations of the one or more pieces of equipment based on at least one of the observability anomaly indicator, the observability health indicator, the tracking performance anomaly indicator, the tracking performance health indicator, the controllability anomaly indicator, or the controllability health indicator.

A second feature, combinable with any of the following features, wherein: the plant system comprises a valve; the one or more actuators comprise a valve actuator that actuates the valve; and sending instructions to the one or more actuators to dynamically change operations of the one or more pieces of equipment comprises sending instructions to the valve actuator of the plant system to dynamically change a position of the valve of the plant system.

A third feature, combinable with any of the following features, wherein the stability radius measure of the state difference comprises one or both of a stability radius of the state difference and a dimensionless rate of change of the stability radius of the state difference, and wherein the stability radius of the state difference comprises one or more orders of the rate of change of the stability radius of the state difference.

A fourth feature, combinable with any of the following features, wherein the stability radius measure of the output difference comprises one or both of a stability radius of the output difference and a dimensionless rate of change of the stability radius of the output difference, wherein the stability radius of the output difference comprises one or more orders of the rate of change of the stability radius of the output difference.

A fifth feature, combinable with any of the following features, wherein the stability radius measure of the control action difference comprises one or both of a stability radius of the control action difference and a dimensionless rate of change of the stability radius of the control action difference, wherein the stability radius of the state difference comprises one or more orders of the rate of change of the stability radius of the control action difference.

A sixth feature, combinable with any of the following features, wherein the spectral correlation comprises a coherence.

A seventh feature, combinable with any of the following features, wherein the plant control system is a sub-system of a global system with a distributed control architecture, and the global system comprises at least two subsystems connected in series or in parallel, and wherein the operations are performed by each of the at least two subsystems internally.

In a second implementation, a control method comprises: receiving, by a control system of a plant control system that comprises a plant system and the control system controlling the plant system, runtime conditions of an operating point of the plant control system, the runtime conditions of the operating point comprising a runtime state of the plant system, a runtime output of the plant system, and a runtime control action applied to the plant system; determining, by the control system, reference conditions of a reference point corresponding to the operating point, the reference conditions of the reference point comprising a reference state of the plant system, a reference output of the plant system, and a reference control action applied to the plant system; computing, by the control system, differences between the reference point and the operating point based on the reference conditions and the runtime conditions, the differences comprising: a state difference between the runtime state and the reference state of the plant system, and an output difference between the runtime output and the reference output of the plant system; computing a stability radius measure of the state difference, a stability radius measure of the output difference, and a stability radius measure of the control action difference; determining an observability anomaly indicator based on a first spectral correlation between the stability radius measure of the output difference and the stability radius measure of the state difference, wherein the first spectral correlation is computed over a first frequency range, wherein the observability anomaly indicator indicates a likelihood of an anomaly occurring in the plant control system with respect to observability, wherein the observability indicates an ability of the control system to estimate a state of the plant system based on a measured output of the plant system; determining an observability health indicator based on a second spectral correlation between the stability radius measure of the output difference and the stability radius measure of the state difference, wherein the second spectral correlation is computed over a second frequency range, wherein the observability health indicator indicates a likelihood of a normal operation of the plant control system with respect to the observability, and wherein the second frequency range is different from the first frequency range; and sending instructions to an actuator of the plant system to dynamically change operation of the plant system based on the observability anomaly indicator and the observability health indicator.

The foregoing and other described implementations can each, optionally, include one or more of the following features:

A first feature, combinable with any of the following features, wherein the controllability anomaly indicator and the controllability health indicator are independent of each other.

A second feature, combinable with any of the previous or following features, wherein: the plant system comprises a valve; the actuator comprises a valve actuator that actuates the valve; and sending instructions to an actuator of the plant system to dynamically change operation of the plant system comprises sending the instructions to the valve actuator of the plant system to dynamically change a position of the valve of the plant system.

A third feature, combinable with any of the following features, wherein the instructions cause the actuator of the plant system to dynamically change the operation of the plant system to reduce the observability anomaly indicator, increase the observability health indicator, or both.

In a third implementation, a control method comprises receiving, by a control system of a plant control system that comprises a plant system and the control system controlling the plant system, runtime conditions of an operating point of the plant control system, the runtime conditions of the operating point comprising a plant system and a control system controlling the plant system, the runtime conditions of the operating point comprising a runtime state of the plant system, a runtime output of the plant system, and a runtime control action applied to the plant system; determining reference conditions of a reference point corresponding to the operating point, the reference conditions of the reference point comprising a reference state of the plant system, a reference output of the plant system, and a reference control action applied to the plant system; computing differences between the reference point and the operating point based on the reference conditions and the runtime conditions, the differences comprising: an output difference between the runtime output and the reference output of the plant system, and a control action difference between the runtime control action and the reference control action applied to the plant system; computing a stability radius measure of the state difference, a stability radius measure of the output difference, and a stability radius measure of the control action difference; determining a tracking performance anomaly indicator based on a third spectral correlation between the stability radius measure of the output difference and the stability radius measure of the control action difference, wherein the third spectral correlation is computed over a third frequency range, wherein the tracking performance anomaly indicator indicates a likelihood of an anomaly occurring in the plant control system with respect to tracking performance, and wherein the tracking performance measures an ability of the control system to track a set point; determining a tracking performance health indicator based on a fourth spectral correlation between the stability radius measure of the output difference and the stability radius measure of the control action difference, wherein the fourth spectral correlation is computed over a fourth frequency range, wherein the tracking performance health indicator indicates a likelihood of a normal operation of the plant control system with respect to the tracking performance, and wherein the fourth frequency range is different from the third frequency range; and sending instructions to an actuator of the plant system to dynamically change operation of the plant system based on the tracking performance anomaly indicator and the tracking performance health indicator.

The foregoing and other described implementations can each, optionally, include one or more of the following features:

A first feature, combinable with any of the following features, wherein the tracking performance anomaly indicator and the tracking performance health indicator are independent of each other.

A second feature, combinable with any of the previous or following features, wherein: the plant system comprises a valve; the actuator comprises a valve actuator that actuates the valve; and sending instructions to an actuator of the plant system to dynamically change operation of the plant system comprises sending the instructions to the valve actuator of the plant system to dynamically change a position of the valve of the plant system.

A third feature, combinable with any of the following features, wherein the instructions cause the actuator of the plant system to dynamically change operation of the plant system to decrease the tracking performance anomaly indicator, increase the tracking performance health indicator, or both.

In a fourth implementation, a non-transitory, computer-readable medium storing one or more instructions executable by a computer system of a control system to perform operations comprising: the operations comprising: receiving, runtime conditions of an operating point of a plant control system comprising a plant system and a control system controlling the plant system, the runtime conditions of the operating point comprising a runtime state of the plant system, a runtime output of the plant system, and a runtime control action applied to the plant system; determining reference conditions of a reference point corresponding to the operating point, the reference conditions of the reference point comprising a reference state of the plant system, a reference output of the plant system, and a reference control action applied to the plant system; computing differences between the reference point and the operating point based on the reference conditions and the runtime conditions, the differences comprising: a state difference between the runtime state and the reference state of the plant system, and a control action difference between the runtime control action and the reference control action applied to the plant system; computing a stability radius measure of the state difference, a stability radius measure of the output difference, and a stability radius measure of the control action difference; determining a controllability anomaly indicator based on a fifth spectral relationship between the stability radius measure of the control action difference and the stability radius of the state difference, wherein the fifth spectral correlation is computed over within a fifth frequency range, wherein the controllability anomaly indicator indicates a likelihood of an anomaly occurring in the plant control system with respect to controllability, and wherein the controllability indicates an ability of the control system to impact a state of the plant system; determining a controllability health indicator based on a sixth spectral relationship between the stability radius measure of the control action difference and the stability radius of the state difference, wherein the sixth spectral correlation is computed over a sixth frequency range, wherein the controllability health indicator indicates a likelihood of a normal operation of the plant control system with respect to the controllability, and wherein the fifth frequency range is different from the sixth frequency range; and sending instructions to an actuator of the plant system to dynamically change operation of the plant system based on the controllability anomaly indicator and the controllability health indicator.

The foregoing and other described implementations can each, optionally, include one or more of the following features:

A first feature, combinable with any of the following features, wherein the controllability anomaly indicator and the controllability health indicator are independent of each other.

A second feature, combinable with any of the previous or following features, wherein: the plant system comprises a valve; the actuator comprises a valve actuator that actuates the valve; and sending instructions to an actuator of the plant system to dynamically change operation of the plant system comprises sending the instructions to the valve actuator of the plant system to dynamically change a position of the valve of the plant system.

A third feature, combinable with any of the following features, wherein the instructions cause the actuator of the plant system to dynamically change operation of the plant system to decrease the controllability anomaly indicator, increase the controllability health indicator, or both.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A system, comprising:
    a plant system comprising one or more pieces of equipment; and
    a control system controlling the plant system, the control system comprising one or more computers and one or more computer memory devices interoperably coupled with the one or more computers and having tangible, non-transitory, machine-readable media storing one or more instructions that, when executed by the one or more computers, perform operations comprising:
    receiving runtime conditions of an operating point comprising a runtime state of the plant system, a runtime output of the plant system, and a runtime control action applied to the plant system;
    determining reference conditions of a reference point corresponding to the operating point, the reference conditions of the reference point comprising a reference state of the plant system, a reference output of the plant system, and a reference control action applied to the plant system;
    computing differences between the reference point and the operating point based on the reference conditions and the runtime conditions, the differences comprising:
    a state difference between the runtime state and the reference state of the plant system, and
    an output difference between the runtime output and the reference output of the plant system;
    computing a stability radius measure of the state difference and a stability radius measure of the output difference;
    determining an observability anomaly indicator based on a first spectral correlation between the stability radius measure of the output difference and the stability radius measure of the state difference, wherein the first spectral correlation is computed over a first frequency range, wherein the observability anomaly indicator indicates a likelihood of an anomaly occurring in the system with respect to observability, wherein the observability indicates an ability of the control system to estimate a state of the plant system based on a measured output of the plant system;
    determining an observability health indicator based on a second spectral correlation between the stability radius measure of the output difference and the stability radius measure of the state difference, wherein the second spectral correlation is computed over a second frequency range, wherein the observability health indicator indicates a likelihood of a normal operation of the system with respect to the observability, and wherein the second frequency range is different from the first frequency range; and
    sending instructions to an actuator of the plant system to dynamically change operation of the plant system based on the observability anomaly indicator and the observability health indicator.

2. The system of claim 1, wherein the observability anomaly indicator and the observability health indicator are independent of each other.

3. The system of claim 1, wherein:
    the plant system comprises a valve;
    the actuator comprises a valve actuator that actuates the valve; and
    sending instructions to an actuator of the plant system to dynamically change operation of the plant system comprises sending the instructions to the valve actuator of the plant system to dynamically change a position of the valve of the plant system.

4. The system of claim 1, wherein the instructions cause the actuator of the plant system to dynamically change the operation of the plant system to reduce the observability anomaly indicator, increase the observability health indicator, or both.

5. The system of claim 1, wherein the stability radius measure of the state difference comprises one or both of a stability radius of the state difference and a dimensionless rate of change of the stability radius of the state difference, and wherein the stability radius of the state difference comprises one or more orders of the rate of change of the stability radius of the state difference.

6. The system of claim 1, wherein the stability radius measure of the output difference comprises one or both of a stability radius of the output difference and a dimensionless rate of change of the stability radius of the output difference, wherein the stability radius of the output difference comprises one or more orders of the rate of change of the stability radius of the output difference.

7. A system, comprising:
    a plant system comprising one or more pieces of equipment; and
    a control system controlling the plant system, the control system comprising one or more computers and one or more computer memory devices interoperably coupled with the one or more computers and having tangible, non-transitory, machine-readable media storing one or more instructions that, when executed by the one or more computers, perform operations comprising:
    receiving runtime conditions of an operating point of the system, the runtime conditions of the operating point comprising a plant system and a control system controlling the plant system, the runtime conditions of the operating point comprising a runtime state of the plant system, a runtime output of the plant system, and a runtime control action applied to the plant system;

determining reference conditions of a reference point corresponding to the operating point, the reference conditions of the reference point comprising a reference state of the plant system, a reference output of the plant system, and a reference control action applied to the plant system;

computing differences between the reference point and the operating point based on the reference conditions and the runtime conditions, the differences comprising:
an output difference between the runtime output and the reference output of the plant system, and
a control action difference between the runtime control action and the reference control action applied to the plant system;

computing a stability radius measure of the output difference, and a stability radius measure of the control action difference;

determining a tracking performance anomaly indicator based on a third spectral correlation between the stability radius measure of the output difference and the stability radius measure of the control action difference, wherein the third spectral correlation is computed over a third frequency range, wherein the tracking performance anomaly indicator indicates a likelihood of an anomaly occurring in the system with respect to tracking performance, and wherein the tracking performance measures an ability of the control system to track a set point;

determining a tracking performance health indicator based on a fourth spectral correlation between the stability radius measure of the output difference and the stability radius measure of the control action difference, wherein the fourth spectral correlation is computed over a fourth frequency range, wherein the tracking performance health indicator indicates a likelihood of a normal operation of the system with respect to the tracking performance, and wherein the fourth frequency range is different from the third frequency range; and sending instructions to an actuator of the plant system to dynamically change operation of the plant system based on the tracking performance anomaly indicator and the tracking performance health indicator.

8. The system of claim 7, wherein the tracking performance anomaly indicator and the tracking performance health indicator are independent of each other.

9. The system of claim 7, wherein:
the plant system comprises a valve;
the actuator comprises a valve actuator that actuates the valve; and
sending instructions to an actuator of the plant system to dynamically change operation of the plant system comprises sending the instructions to the valve actuator of the plant system to dynamically change a position of the valve of the plant system.

10. The system of claim 7, wherein the instructions cause the actuator of the plant system to dynamically change operation of the plant system to decrease the tracking performance anomaly indicator, increase the tracking performance health indicator, or both.

11. The system of claim 7, wherein the stability radius measure of the output difference comprises one or both of a stability radius of the output difference and a dimensionless rate of change of the stability radius of the output difference, wherein the stability radius of the output difference comprises one or more orders of the rate of change of the stability radius of the output difference.

12. The system of claim 7, wherein the stability radius measure of the control action difference comprises one or both of a stability radius of the control action difference and a dimensionless rate of change of the stability radius of the control action difference, wherein the stability radius of the control action difference comprises one or more orders of the rate of change of the stability radius of the control action difference.

13. A system, comprising:
a plant system comprising one or more pieces of equipment; and
a control system controlling the plant system, the control system comprising one or more computers and one or more computer memory devices interoperably coupled with the one or more computers and having tangible, non-transitory, machine-readable media storing one or more instructions that, when executed by the one or more computers, perform operations comprising:

receiving runtime conditions of an operating point of a system comprising a plant system and a control system controlling the plant system, the runtime conditions of the operating point comprising a runtime state of the plant system, a runtime output of the plant system, and a runtime control action applied to the plant system;

determining reference conditions of a reference point corresponding to the operating point, the reference conditions of the reference point comprising a reference state of the plant system, a reference output of the plant system, and a reference control action applied to the plant system;

computing differences between the reference point and the operating point based on the reference conditions and the runtime conditions, the differences comprising:
a state difference between the runtime state and the reference state of the plant system, and
a control action difference between the runtime control action and the reference control action applied to the plant system;

computing a stability radius measure of the state difference and a stability radius measure of the control action difference;

determining a controllability anomaly indicator based on a fifth spectral correlation between the stability radius measure of the control action difference and the stability radius measure of the state difference, wherein the fifth spectral correlation is computed over within a fifth frequency range, wherein the controllability anomaly indicator indicates a likelihood of an anomaly occurring in the system with respect to controllability, and wherein the controllability indicates an ability of the control system to impact a state of the plant system;

determining a controllability health indicator based on a sixth spectral correlation between the stability radius measure of the control action difference and the stability radius measure of the state difference, wherein the sixth spectral correlation is computed over a sixth frequency range, wherein the controllability health indicator indicates a likelihood of a normal operation of the system with respect to the controllability, and wherein the fifth frequency range is different from the sixth frequency range; and sending instructions to an actuator of the plant system to dynamically change operation of the plant system based on the controllability anomaly indicator and the controllability health indicator.

14. The system of claim 13, wherein the controllability anomaly indicator and the controllability health indicator are independent of each other.

15. The system of claim 13, wherein:

the plant system comprises a valve;

the actuator comprises a valve actuator that actuates the valve; and sending instructions to an actuator of the plant system to dynamically change operation of the plant system comprises sending the instructions to the valve actuator of the plant system to dynamically change a position of the valve of the plant system.

16. The system of claim 13, wherein the instructions cause the actuator of the plant system to dynamically change operation of the plant system to decrease the controllability anomaly indicator, increase the controllability health indicator, or both.

17. The system of claim 13, wherein the stability radius measure of the state difference comprises one or both of a stability radius of the state difference and a dimensionless rate of change of the stability radius of the state difference, and wherein the stability radius of the state difference comprises one or more orders of the rate of change of the stability radius of the state difference.

18. The system of claim 13, wherein the stability radius measure of the control action difference comprises one or both of a stability radius of the control action difference and a dimensionless rate of change of the stability radius of the control action difference, wherein the stability radius of the state difference comprises one or more orders of the rate of change of the stability radius of the control action difference.

* * * * *

UNITED STATES PATENT AND TRADEMARK OFFICE
CERTIFICATE OF CORRECTION

| | | |
|---|---|---|
| PATENT NO. | : 10,921,798 B2 | |
| APPLICATION NO. | : 16/664289 | |
| DATED | : February 16, 2021 | |
| INVENTOR(S) | : Kamran Eftekhari Shahroudi | |

It is certified that error appears in the above-identified patent and that said Letters Patent is hereby corrected as shown below:

On the Title Page

In Page 2, Column 2, item (56) Other Publications, Line 30, please delete "Gasturbines" and insert -- Gas turbines --

In the Specification

In Column 2, Line 11, please delete "For" and insert -- for --

In Column 9, Line 44, please delete "p" and insert -- ρ --

In Column 9, Line 44, please delete "variable a" and insert -- variable α --

In Column 9, Line 46, please delete "a" and insert -- α --

In Column 9, Line 47, please delete "$p_a$" and insert -- $ρ_α$ --

In Column 9, Lines 60-62, please delete "$ρ_a^2 = w_0 δ_a^2 +$" and insert -- $ρ_α^2 = w_0 δ_α^2 +$ --

In Column 9, Line 63, after "$ρ_α^2 = w_0 δ_α^2 + w_1 \left(\frac{\partial δ_α}{\partial t}\right)^2 + w_2 \left(\frac{\partial^2 δ_α}{\partial^2 t}\right)^2 + \cdots + w_n \left(\frac{\partial^n δ_α}{\partial^n t}\right)^2$ (4)," please insert -- or --

In Column 10, Line 10, please delete "a" and insert -- α --

In Column 10, Line 13, please delete "If a" and insert -- If α --

In Column 10, Line 54, please delete "densitb" and insert -- density --

Signed and Sealed this
First Day of November, 2022

Katherine Kelly Vidal
*Director of the United States Patent and Trademark Office*

CERTIFICATE OF CORRECTION (continued)
U.S. Pat. No. 10,921,798 B2

Page 2 of 2

In Column 13, Line 44, please delete "$f_{h_{hi}}$" and insert -- $f_{h_{hi}}$ --

In Column 13, Line 59, please delete "V" and insert -- ∀ --

In Column 17, Line 42, please delete "δU=100*(ValveCmd %–Valve %)/ValveRef %" and insert -- $\delta U = 100 * (ValveCmd_\% - Valve_\%)/ValveRef_\%$ --

In Column 17, Line 45, please delete "(10)." and insert -- (10) --

In Column 19, Lines 60-63, after "output" please delete "$\frac{\partial \ln(\rho\ )}{\partial t}$" and insert -- $\frac{\partial \ln(\rho)}{\partial t}$ --

In Column 20, Line 18, after "output" please delete "(e.g., $\rho_{-Y}$,"

In Column 20, Lines 24-25, after "state" please delete "(e.g., $\rho_{-X}$,"

In Column 21, Line 49, after "output" please delete "(e.g., $\rho_{-Y}$,"

In Column 21, Lines 56-57, after "action" please delete "(e.g., $\rho_{-U}$,"